United States Patent
Han et al.

(10) Patent No.: US 8,593,415 B2
(45) Date of Patent: Nov. 26, 2013

(54) METHOD FOR PROCESSING TOUCH SIGNAL IN MOBILE TERMINAL AND MOBILE TERMINAL USING THE SAME

(75) Inventors: Jae Won Han, Seoul (KR); Min Kyu Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 847 days.

(21) Appl. No.: 12/720,620

(22) Filed: Mar. 9, 2010

(65) Prior Publication Data

US 2010/0321312 A1  Dec. 23, 2010

(30) Foreign Application Priority Data

Jun. 19, 2009 (KR) .................. 10-2009-0054937
Oct. 7, 2009 (KR) .................. 10-2009-0095185

(51) Int. Cl.
*G09G 5/00* (2006.01)

(52) U.S. Cl.
USPC .......................................... 345/173

(58) Field of Classification Search
USPC ............... 345/173; 178/18.01; 715/863–866
See application file for complete search history.

(56) References Cited

U.S. PATENT DOCUMENTS

| | | | |
|---|---|---|---|
| 7,760,187 B2 * | 7/2010 | Kennedy | 345/173 |
| 2004/0108995 A1 * | 6/2004 | Hoshino et al. | 345/173 |
| 2005/0259087 A1 * | 11/2005 | Hoshino et al. | 345/173 |
| 2006/0227114 A1 * | 10/2006 | Geaghan et al. | 345/173 |
| 2008/0165136 A1 * | 7/2008 | Christie et al. | 345/173 |
| 2008/0211766 A1 * | 9/2008 | Westerman et al. | 345/156 |
| 2008/0211778 A1 * | 9/2008 | Ording et al. | 345/173 |
| 2009/0040188 A1 * | 2/2009 | Chu | 345/173 |
| 2009/0128510 A1 * | 5/2009 | Hagiwara | 345/173 |
| 2009/0164930 A1 * | 6/2009 | Chen et al. | 715/769 |
| 2009/0322691 A1 * | 12/2009 | Chiu | 345/173 |
| 2010/0066688 A1 * | 3/2010 | Jeon | 345/173 |
| 2010/0137031 A1 * | 6/2010 | Griffin et al. | 455/566 |
| 2010/0149127 A1 * | 6/2010 | Fisher et al. | 345/174 |
| 2010/0201615 A1 * | 8/2010 | Tupman et al. | 345/156 |
| 2010/0238109 A1 * | 9/2010 | Cook et al. | 345/156 |
| 2010/0251176 A1 * | 9/2010 | Fong et al. | 715/821 |
| 2010/0283744 A1 * | 11/2010 | Nordenhake et al. | 345/173 |
| 2011/0003621 A1 * | 1/2011 | Atsumi | 455/566 |

\* cited by examiner

*Primary Examiner* — Tom Sheng
(74) *Attorney, Agent, or Firm* — Lee, Hong, Degerman, Kang & Waimey

(57) ABSTRACT

A method for processing a touch signal in a mobile terminal and a mobile terminal using the same are disclosed, wherein the method comprises: detecting a shaking of a mobile terminal by using a mobile terminal shaking detection sensor within a predetermined time from a touched time while a touch screen is being touched; and outputting an output signal based on the detected shaking.

18 Claims, 26 Drawing Sheets

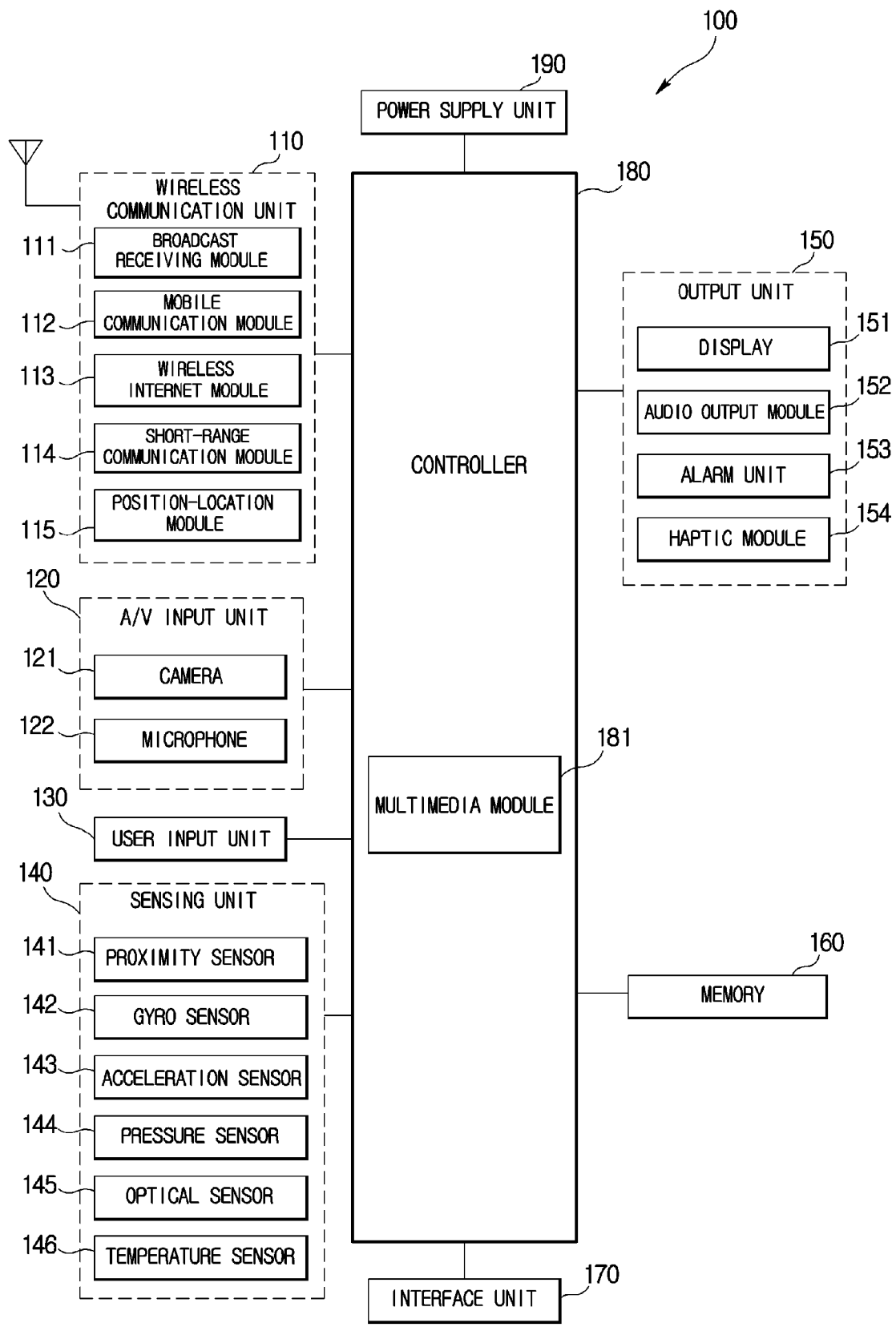

(a)  (b)

(a)  (b)

(a)　　　　　　　　　(b)

(a)　　　　　　　　　(b)

FIG. 9
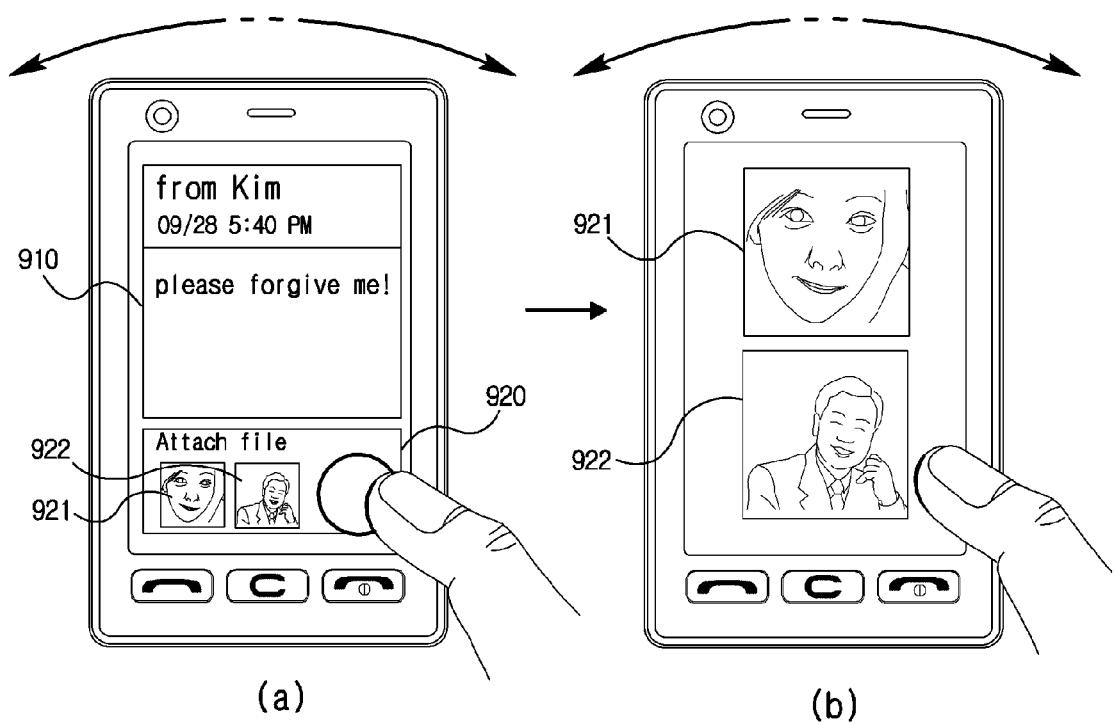
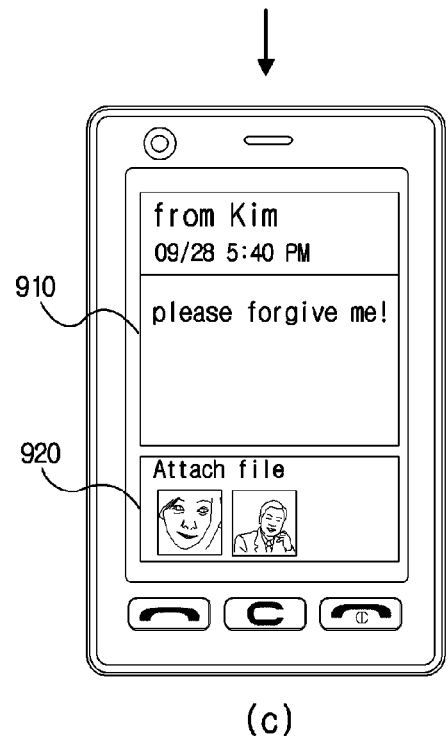

(a)          (b)

(a)          (b)

FIG. 18
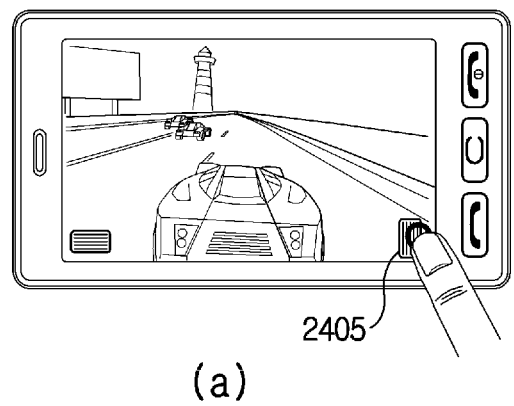
(a)
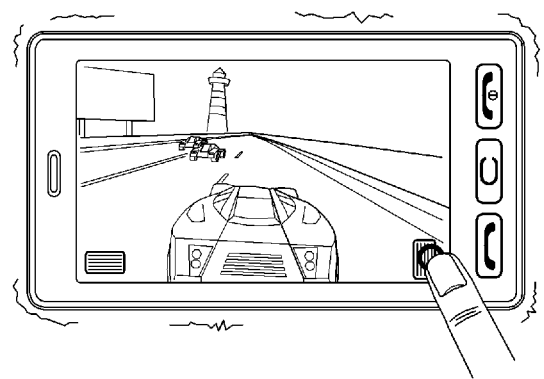
(b)
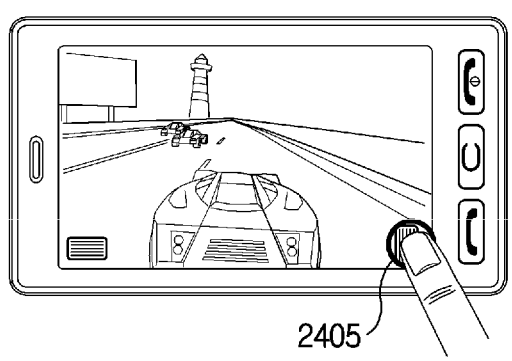
(c)
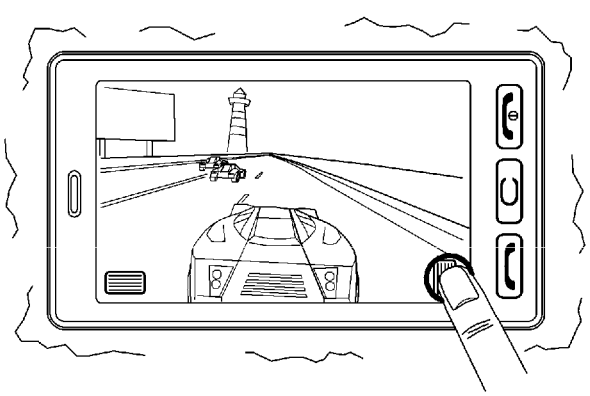
(d)

FIG. 19
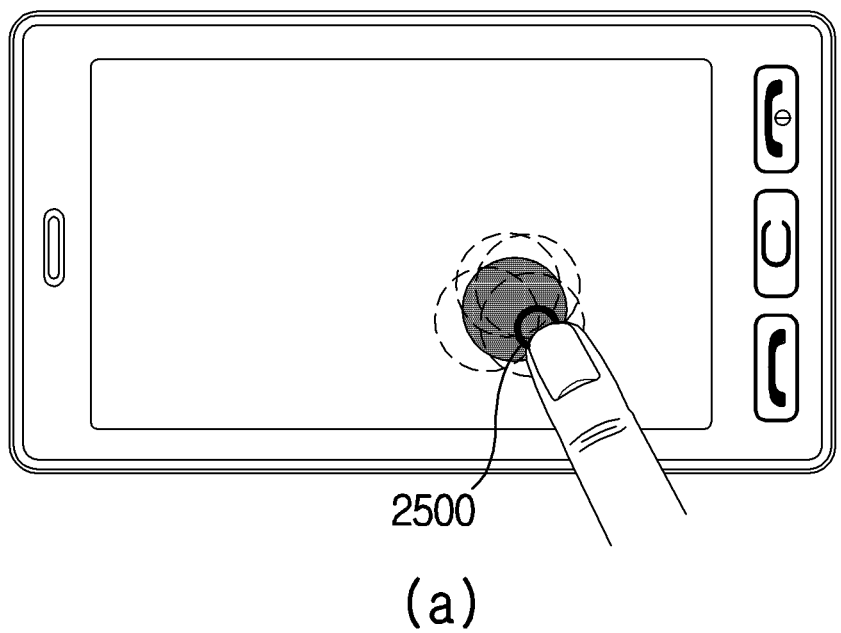
(a)
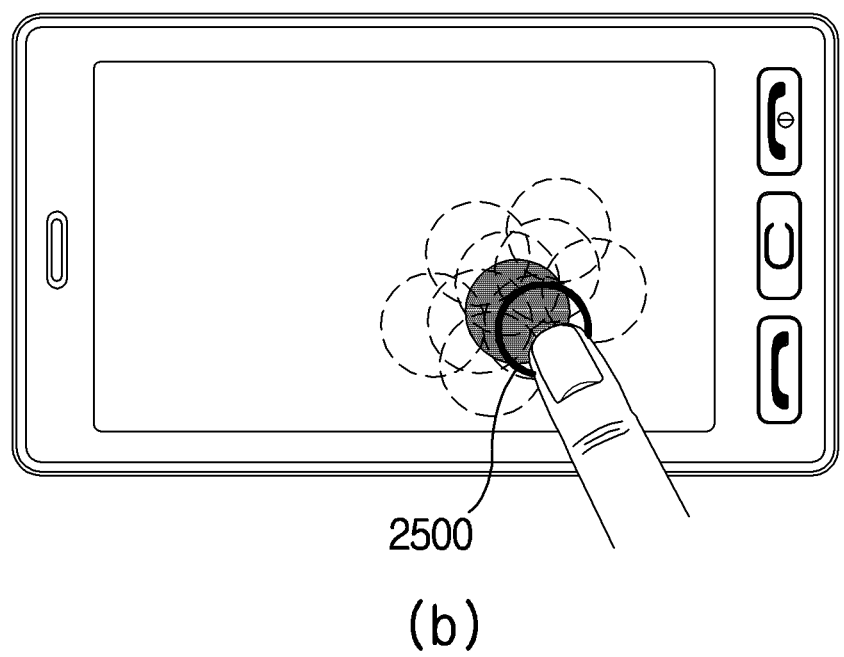
(b)

FIG. 21
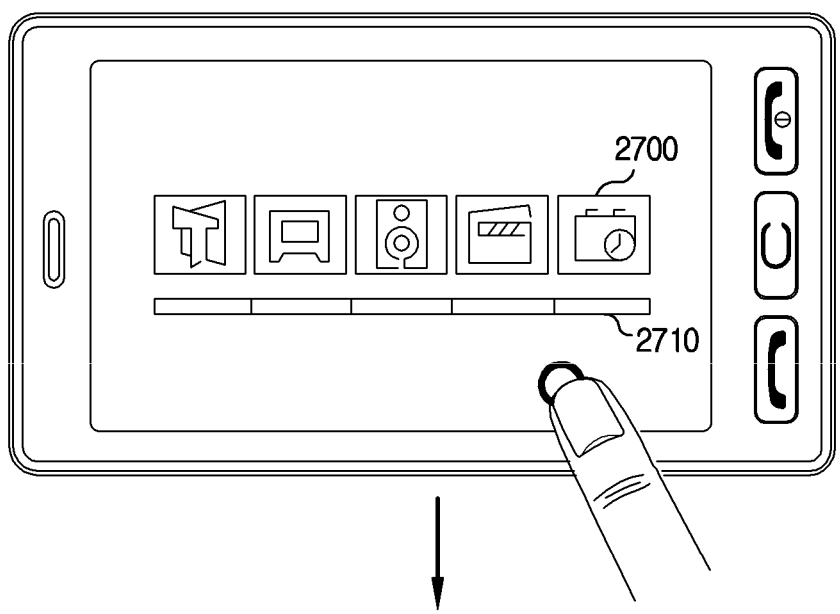
(a)
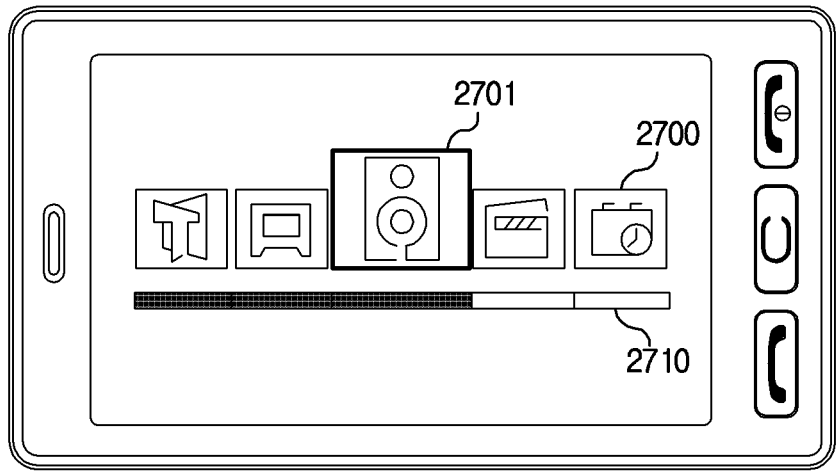
(b)

FIG. 23
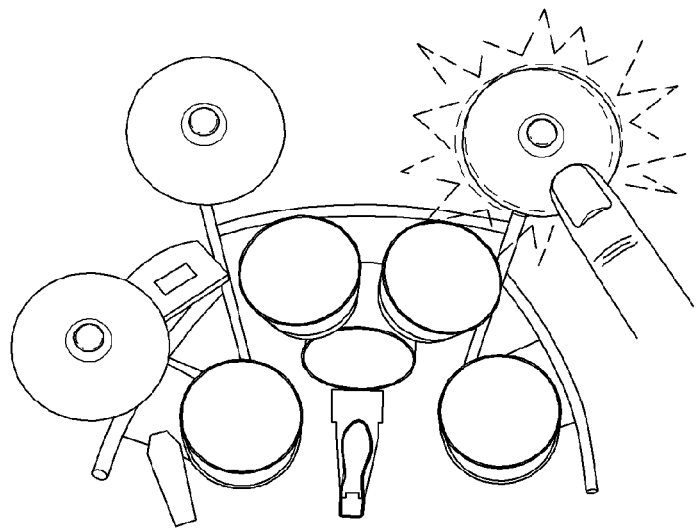
(a)
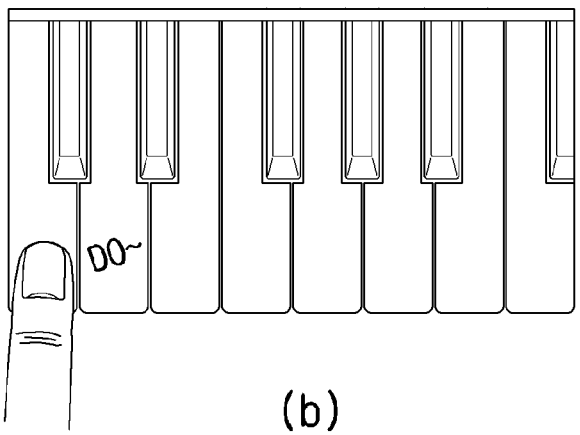
(b)
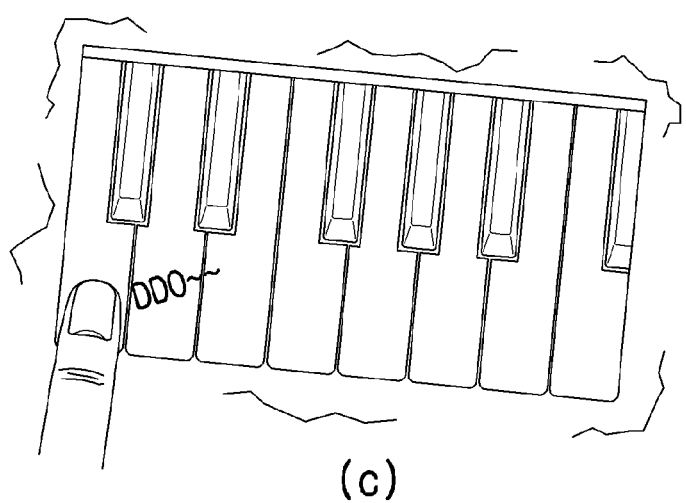
(c)

FIG. 24
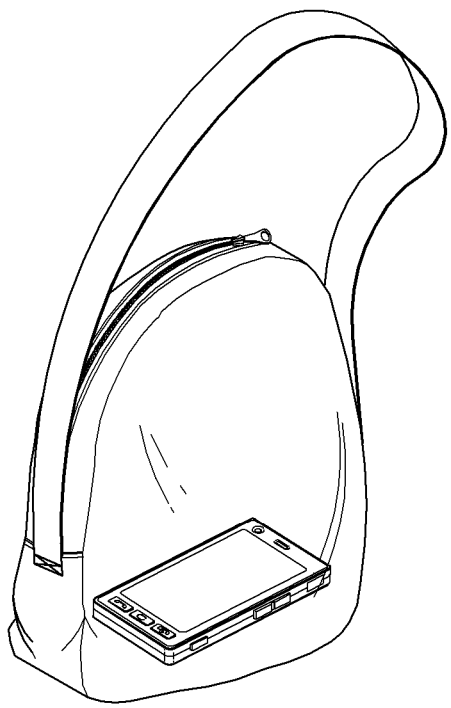
(a)
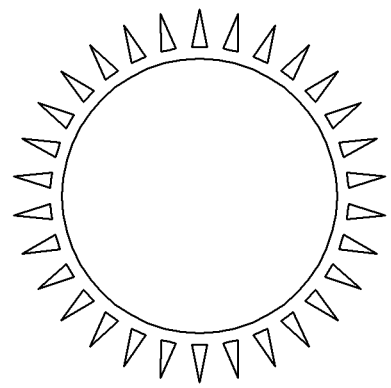
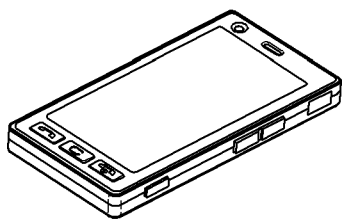
(b)

METHOD FOR PROCESSING TOUCH SIGNAL IN MOBILE TERMINAL AND MOBILE TERMINAL USING THE SAME

Pursuant to 35 U.S.C. §119(a), this application claims the benefit of earlier filing date and right of priority to Korean Application Nos. 10-2009-0054937, filed on Jun. 19, 2009, and 10-2009-0095185, filed on Oct. 7, 2009, the contents of all which are hereby incorporated by reference herein in their entireties.

BACKGROUND OF THE DISCLOSURE

1. Field

The present disclosure relates to a method for processing touch signal in mobile terminal for outputting respectively different output signals in response to a touch and a mobile terminal using the same.

2. Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To implement the complex functions in the multimedia player, improvement of structural parts and/or software parts of the terminal may be considered in various attempts.

For instance, a user interface environment may be provided for the user to search or select functions in an easy and convenient way.

SUMMARY

In one general aspect, an object of the present disclosure is to provide a method for processing a touch signal in a mobile terminal, the method comprising: detecting a shaking of a mobile terminal by using a mobile terminal shaking detection sensor within a predetermined time from a touched time while a touch screen is touched; and outputting an output signal based on the detected shaking.

In some exemplary embodiments, the step of detecting a shaking of a mobile terminal by using a mobile terminal shaking detection sensor within a predetermined time from a touched time while a touch screen is touched may comprise: displaying an image data and zoom-in/out icons on the touch screen; and detecting a shaking frequency of the mobile terminal while one of the zoom-in/zoom-out icons is touched, and the step of outputting an output signal based on the detected shaking comprises zooming-in or zooming-out the image data based on the detected shaking frequency.

In some exemplary embodiments, the method for processing a touch signal in a mobile terminal may further comprise: displaying an image data and zoom-in/zoom-out icons on the touch screen; touching anyone of the zoom-in/zoom-out icons; using the shaking detection sensor of the mobile terminal to detect the intensity of the shaking of the mobile terminal in response to the touch; and enlarging or reducing the image data to the maximum or minimum if the detected shaking intensity is greater than a predetermined shaking intensity.

In some exemplary embodiments, the method for processing a touch signal in a mobile terminal may further comprise: displaying a data, a scroll bar and a direction scroll key on the touch screen; touching the direction scroll key; detecting a shaking intensity of the mobile terminal in response to the touch using the shaking detection sensor of the mobile terminal; and scrolling to display a first screen or a last screen if the detected shaking intensity is greater than a predetermined shaking intensity.

In some exemplary embodiments, the method for processing a touch signal in a mobile terminal may further comprise: displaying a data, page up/page-down icons on the touch screen; touching the page up/page-down icons; detecting the shaking intensity of the mobile terminal using the shaking detection sensor of the mobile terminal; and moving the screen to a first page or a last page to display the first page or the last page on the screen if the detected shaking intensity is greater than a predetermined shaking intensity.

In some exemplary embodiments, the step of detecting a shaking of a mobile terminal by using a mobile terminal shaking detection sensor within a predetermined time from a touched time while a touch screen is touched may comprise: displaying a contact icon on the touch screen; shaking the mobile terminal while the contact icon is touched; detecting the shaking frequency of the mobile terminal, and wherein the step of outputting an output signal based on the detected shaking may comprise transmitting a call signal to a mobile terminal corresponding to the contact icon based on the detected shaking frequency, or displaying a message window for preparing a message to be transmitted to a mobile terminal corresponding to the contact icon.

In some exemplary embodiments, the step of detecting a shaking of a mobile terminal by using a mobile terminal shaking detection sensor within a predetermined time from a touched time while a touch screen is touched may comprise: displaying a data on the screen; shaking the mobile terminal while the data is being touched; and detecting the shaking the mobile terminal, and wherein the step of outputting an output signal based on the detected shaking may comprise changing the display size of the data based on the detected shaking.

In some exemplary embodiments, the step of detecting a shaking of a mobile terminal by using a mobile terminal shaking detection sensor within a predetermined time from a touched time while a touch screen is touched may comprise: displaying a message list received on the touch screen; shaking the mobile terminal while the message list is being touched; and detecting the shaking of the mobile terminal, and wherein the step of outputting an output signal based on the detected shaking may comprise sequentially displaying messages included in the message list.

In some exemplary embodiments, the method for processing a touch signal in a mobile terminal may further comprise: outputting a background sound and simultaneously displaying a data on the touch screen; touching the touch screen; using the mobile terminal shaking detection sensor to detect a shaking intensity of the mobile terminal in response to the touch; displaying a background sound change icon if the detected shaking intensity is greater than a predetermined shaking intensity, and wherein the step of detecting a shaking of a mobile terminal by using a mobile terminal shaking detection sensor within a predetermined time from a touched time while a touch screen is touched may comprise: shaking the mobile terminal while the background sound change icon is being touched; and detecting the shaking of the mobile terminal, and the step of outputting an output signal based on the detected shaking comprises sequentially outputting the changed background sounds in response to the detected shaking.

In some exemplary embodiments, the method for processing a touch signal in a mobile terminal may further comprise: executing background applications; touching the touch screen; using the mobile terminal shaking detection sensor to detect a shaking intensity of the mobile terminal in response to the touch; and displaying icons representing the background applications if the detected shaking intensity is greater than a predetermined shaking intensity, and wherein the step of outputting an output signal based on the detected shaking may comprise selecting the icon in response to the detected shaking or executing a function corresponding to the icon.

In some exemplary embodiments, the step of detecting a shaking of a mobile terminal by using a mobile terminal shaking detection sensor within a predetermined time from a touched time while a touch screen is touched may comprise: displaying a first key board and a second key board on the touch screen where the first key board is in an activated state while the second key board is in a deactivated state; shaking the mobile terminal by one of the keys in the first key board being touched, and wherein the step of outputting an output signal based on the detected shaking may comprise deactivating the first key board while activating the first key board, and inputting a character of the second key board corresponding to a position of the touched key if the shaking of the mobile terminal is greater than a predetermined shaking intensity.

Another object of the present disclosure is to provide a mobile terminal comprising: a touch screen; a mobile terminal shaking detection sensor configured to detect a shaking of the mobile terminal and to output a detection signal; and a controller configured to output an output signal based on a received detection signal if the detection signal is received within a predetermined time from the touched time while the touch screen is being touched.

In some exemplary embodiments, the touch screen is displayed with an image data and zoom-in/zoom-out icons, and the controller detects a shaking frequency of the mobile terminal while one of the zoom-in/zoom-out icons is being touched using the mobile terminal shaking detection sensor, and zooming in the image data based on the detected shaking frequency.

In some exemplary embodiments, the touch screen is displayed with a contact icon, and the controller detects a shaking frequency of the mobile terminal while the contact icon is being touched using the mobile terminal shaking detection sensor, and transmits a call signal to a mobile terminal corresponding to the contact icon or displays on the touch screen a message window for preparing a message for being transmitted to a mobile terminal corresponding to the contact icon.

In another general aspect, an object of the present disclosure is to provide a method for processing a touch signal in a mobile terminal, the method comprising: detecting a shaking intensity of a mobile terminal by using a mobile terminal shaking detection sensor within a predetermined time based on touch on a touch screen; and outputting respectively different output signals based on the detected shaking intensity.

In some exemplary embodiments, the step of detecting the shaking intensity may comprise: displaying at least one of an icon, a window and an image on the touch screen; detecting a mobile terminal shaking intensity based on the touch in a case at least one of the displayed icon, window and image is touched.

In some exemplary embodiments, the method for processing a touch signal in a mobile terminal may comprise displaying an icon for displaying the shaking intensity.

In some exemplary embodiments, the method for processing a touch signal in a mobile terminal may further comprise outputting feedback signals corresponding to respective different output signals, wherein the step of outputting the feedback signals may comprise outputting at least one of a shaking of an image, an intensity of vibration and an intensity of sound using at least one of the shaking of an image, the intensity of vibration and the intensity of sound based on the shaking intensity.

In some exemplary embodiments, the step of outputting feedback signals corresponding to respective different output signals may comprise displaying mutually different icons or windows, or displaying mutually different sizes of icons or windows based on the shaking intensity. In some exemplary embodiments, the step of outputting feedback signals corresponding to respective different output signals may comprise: displaying a phone book; and designating the item in a different group based on touched intensity of the displayed item.

According to the aforementioned configurations, a user can differentiate the shaking intensity and the shaking frequency of the mobile terminal in response to the touch, whereby various functions of the mobile terminal can be conveniently selected.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 is a block diagram of a mobile terminal in accordance with an exemplary embodiment of the present disclosure.

FIG. 9 is an image drawing for illustrating a method for processing a touch signal in a mobile terminal according to a sixth exemplary embodiment of the present invention.

FIG. 18 is an image drawing for illustrating a method for processing a touch signal in a mobile terminal according to a fourteenth exemplary embodiment of the present invention.

FIG. 19 is an image drawing for illustrating a method for processing a touch signal in a mobile terminal according to a fifteenth exemplary embodiment of the present invention.

FIG. 21 is an image drawing for illustrating a method for processing a touch signal in a mobile terminal according to a seventeenth exemplary embodiment of the present invention.

FIG. 23 is an image drawing for illustrating a method for processing a touch signal in a mobile terminal according to a nineteenth exemplary embodiment of the present invention.

FIG. 24 is an image drawing for illustrating a method for processing a touch signal in a mobile terminal according to a twentieth exemplary embodiment of the present invention.

DETAILED DESCRIPTION

Figure 2A:
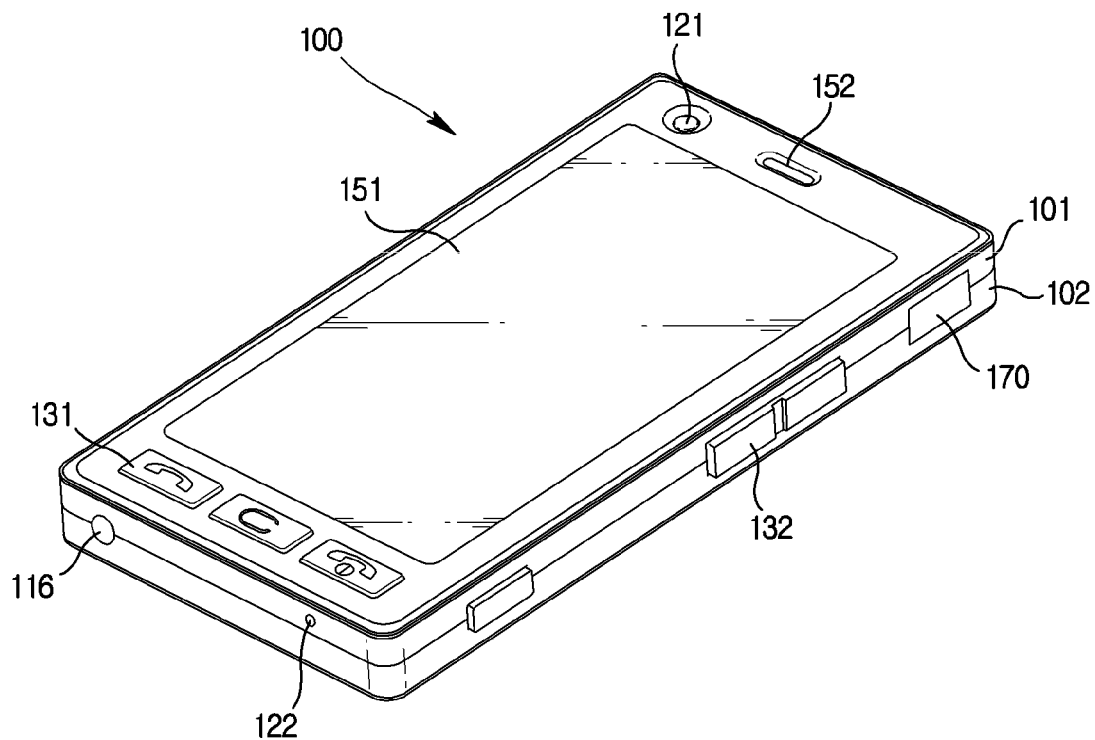
FIG. 2*a* is a front perspective view of a mobile terminal according to an exemplary embodiment of the present disclosure.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereinafter a touch sensor) are constructed in a mutual-layered structure (hereinafter a touch screen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touch screen or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touch screen is an electrostatic type, the proximity sensor 141 may detect proximity of a pointer using a variation of an electric field according to the proximity of the pointer. In this case, the touch screen (touch sensor) may be classified into the proximity sensor.

An action in which a pointer approaches the touch screen without contacting the touch screen may be called a proximity touch. An action in which a pointer actually touches the touch screen may be called a contact touch. The location of the touch screen proximity-touched by the pointer may be the position of the pointer that vertically opposes the touch screen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touch screen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touch screen as a character an/or recognizing a picture drawing input performed on the touch screen as an image.

The power supply 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

FIG. 2A is a front-view of a mobile terminal according to an example embodiment. Other embodiments, configurations and arrangements may also be provided.

As shown in FIG. 2A, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
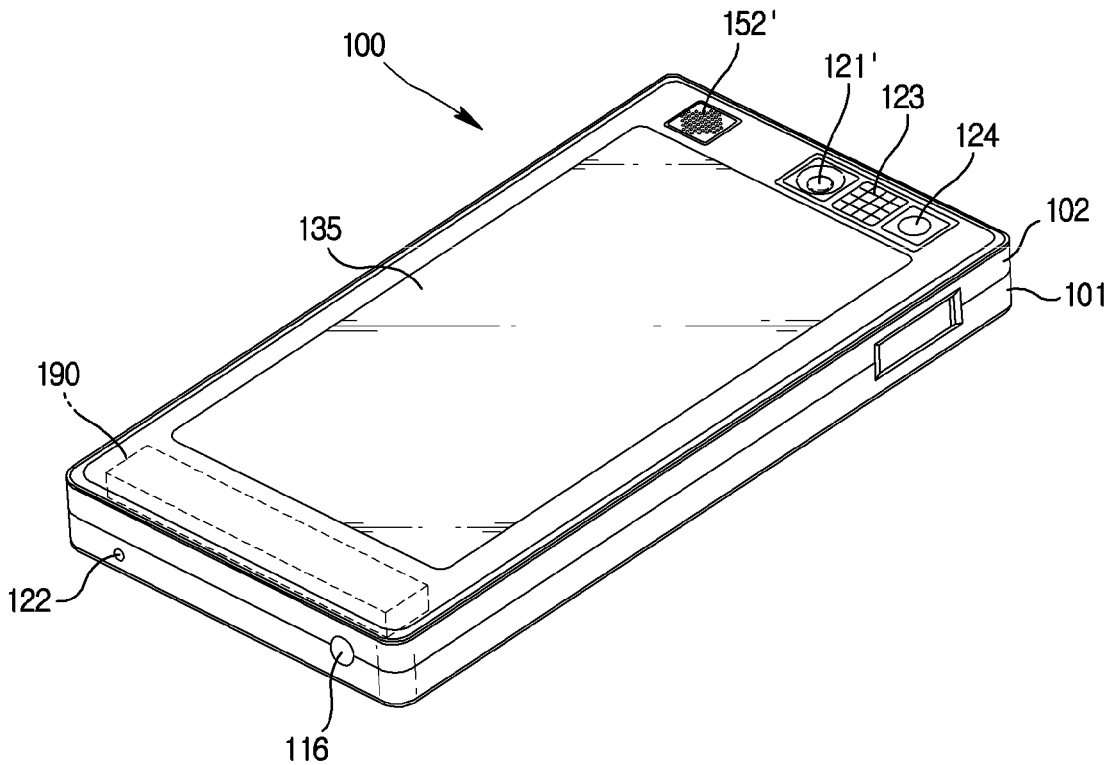
FIG. 2*b* is a backside perspective view of a mobile terminal according to an exemplary embodiment of the present disclosure.

FIG. 2B is a perspective diagram of a backside of the mobile terminal shown in FIG. 2A. Other embodiments, configurations and arrangements may also be provided.

As shown in FIG. 2B, a camera 121' may be additionally provided on a backside of the terminal body, and more particularly on the rear case 102. The camera 121' may have a photographing direction that is substantially opposite to a photographing direction of the camera 121 (shown in FIG. 2A) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body.

FIG. 2B also shows a touchpad 135 for detecting a touch that is additionally provided on the rear case 102. The touchpad 135 may be configured in a light transmittive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touch screen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

In the following description, the method for processing a touch signal in a mobile terminal according to exemplary embodiments of the present disclosure will be explained, referring to the accompanying drawings.

Figure 3:
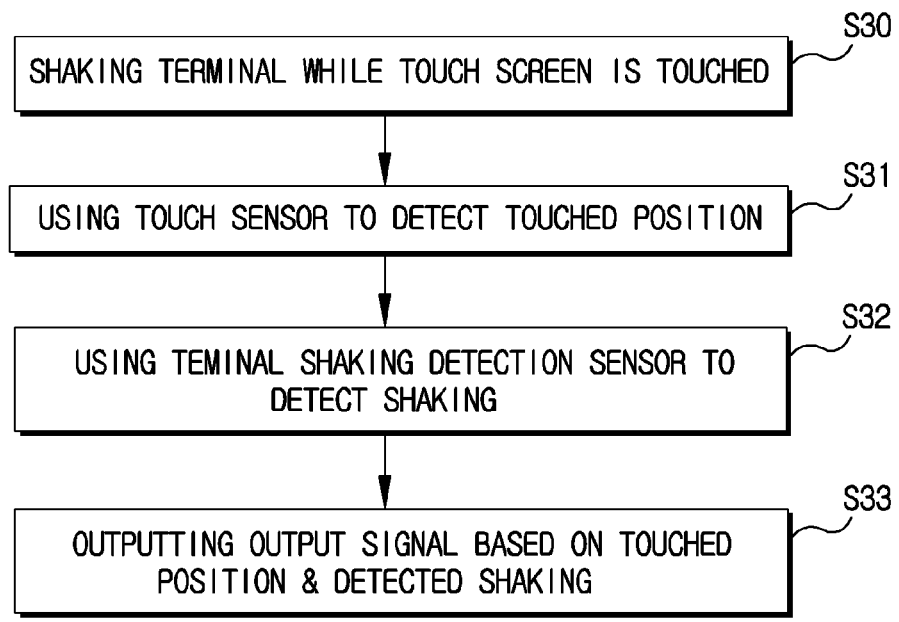
FIG. 3 is a flowchart of a method for processing a touch signal in a mobile terminal according to an exemplary embodiment of the present disclosure.

FIG. 3 is a flowchart of a method for processing a touch signal in a mobile terminal according to an exemplary embodiment of the present disclosure.

The controller 180 displays an object on the touch screen. The object may include an icon, an item, a window and an image. The image may define an entire image screen displayed on the touch screen, or a part of the entire image screen displayed on the touch screen.

A user may shake the mobile terminal 100 (hereinafter referred to as terminal) while any one object of the displayed objects is being touched (S30). The touch sensor detects a touched position to generate a touch position signal (S31). The touch sensor transmits the touch position signal to the controller 180. The controller 180 identifies what object has been touched based on the touch position signal. The terminal shaking detection sensor detects the shaking of the terminal to generate a shaking detection signal (S32).

The controller 180 controls in such a manner that the terminal shaking detection sensor detects the shaking of the terminal only within a predetermined time from a time the touch was implemented. The terminal shaking detection sensor transmits the shaking detection signal to the controller 180. The terminal shaking detection sensor may define a sensor capable of sensing shaking of the terminal such as a gyro sensor 142 or an acceleration speed sensor 143. The controller 180 outputs another output signal based on the touch position signal and the shaking detection signal (S33). A detailed content thereto will be described with reference to FIGS. 4 to 16.

Hereinafter, a method for processing a touch signal in a mobile terminal and a mobile terminal using the same will be described in detail with reference to FIGS. 4 to 16.

Figure 4:
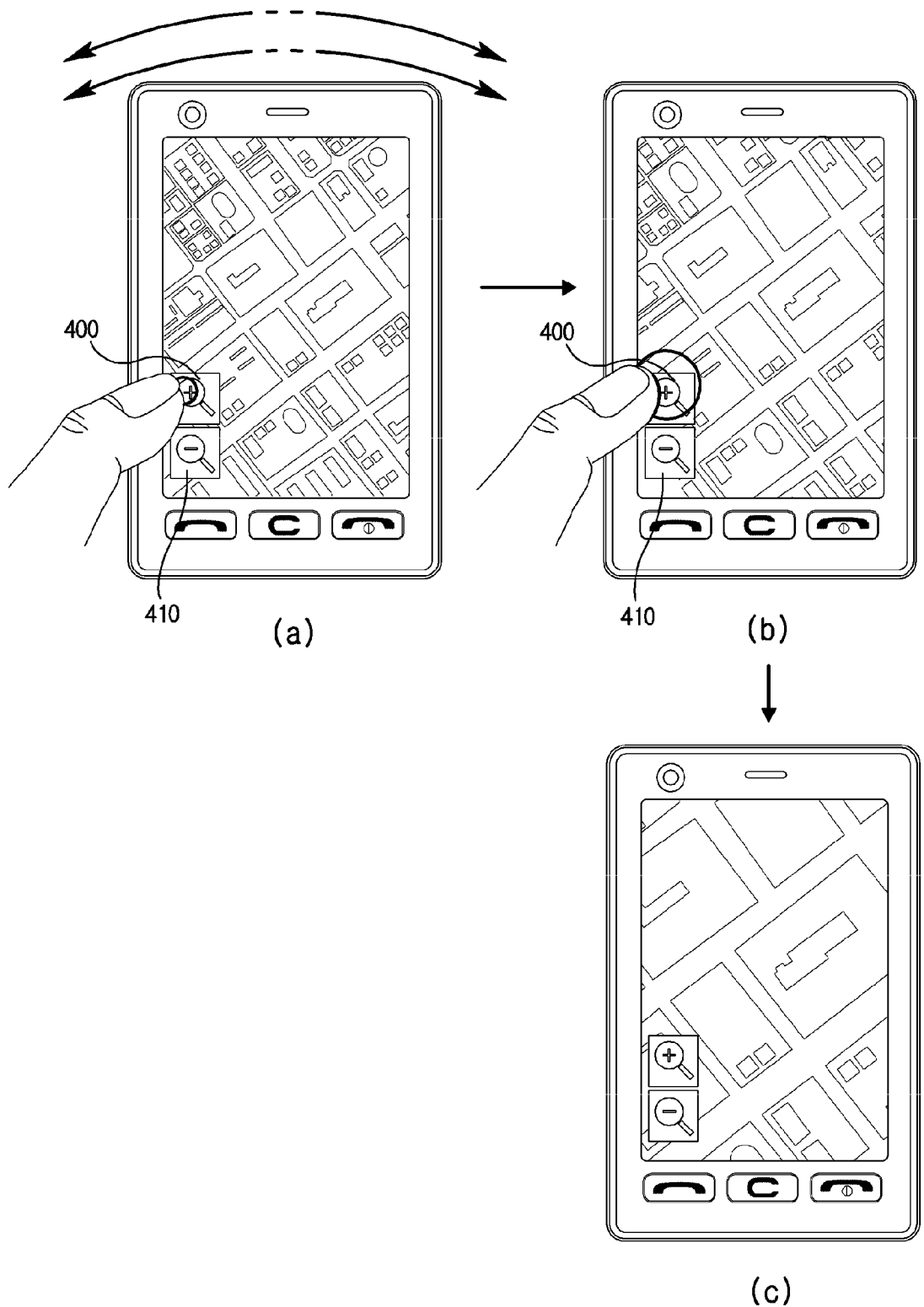
FIG. 4 is an image drawing for illustrating a method for processing a touch signal in a mobile terminal according to a first exemplary embodiment of the present invention.

FIG. 4 is an image drawing for illustrating a method for processing a touch signal in a mobile terminal according to a first exemplary embodiment of the present invention.

In a case a user inputs a display signal for displaying an image data, the controller 180 displays on the touch screen image data, a zoom-in icon 400 and a zoom-out icon 410 (see FIG. 4a). The user shakes the terminal twice while the zoom-in icon 400 is touched using a pointing device. The pointing device may be a finger, a stylus pen or the like.

At this time, the controller 180 identifies if the zoom-in icon 400 has been touched based on the touch position signal received from the touch sensor. The terminal shaking detection sensor detects the shaking frequency of the terminal 100 to generate a shaking detection signal.

At this time, the shaking frequency is identified as a shaking frequency in a case the terminal goes beyond a predetermined position change range, whereby an error can be reduced in which a little shaking of the terminal is identified as the shaking frequency.

Successively, the terminal shaking detection sensor transmits the shaking detection signal to the controller 180. The controller 180 enlarges the image data based on the shaking detection signal and displays the enlarged image data (see FIG. 4b).

The controller 180 controls in such a fashion that the terminal shaking detection sensor detects the shaking of the terminal only within a predetermined time from a time the touch was implemented. For example, in a case the terminal is shaken twice within a predetermined time after the zoom-in icon 400 is touched, the controller 180 enlarges the image data three times and displays the three times enlarged image data.

In a case the terminal is shaken three times, the controller 180 enlarges the image data four times and displays the four times enlarged image data. The enlargement ratio may be set up as twice or three times, and may be established by way of scale (e.g., 1:50,000, 1:25,000).

Alternatively, the user may use the pointing device to strongly touch the zoom-in icon 400. Then, the terminal shaking detection sensor detects a shaking intensity of the terminal in response to the touch to generate a shaking detection signal. Successively, the terminal shaking detection sensor transmits the shaking detection signal to the controller 180.

The controller 180 enlarges the image data to the maximum and displays the maximally enlarged image data if the detected shaking intensity is greater than a predetermined shaking intensity based on the shaking detection signal (see FIG. 4c).

On the other hand, if the detected shaking intensity is smaller than a predetermined shaking intensity based on the shaking detection signal, the controller 180 enlarges the image data by a first stage and displays the image data on the display as the zoom-in icon 400 has been touched once. The predetermined shaking intensity is used as a standard for checking if the shaking has been strong.

Furthermore, the predetermined shaking intensity may be set up by a user or by a mobile terminal manufacturer. Even in case of using the zoom-out icon, the image data may be reduced by the aforementioned method.

As a result, the user may easily select a desired enlargement ratio. In addition, the user may strongly touch the icon to enlarge or reduce the image data to the maximum. Furthermore, in a case fees are charged every time the enlargement or reduction is implemented, an unnecessary payment of fees can be prevented according to the present invention.

FIG. 5 is an image drawing for illustrating a method for processing a touch signal in a mobile terminal according to a second exemplary embodiment of the present invention.

Figure 5A:
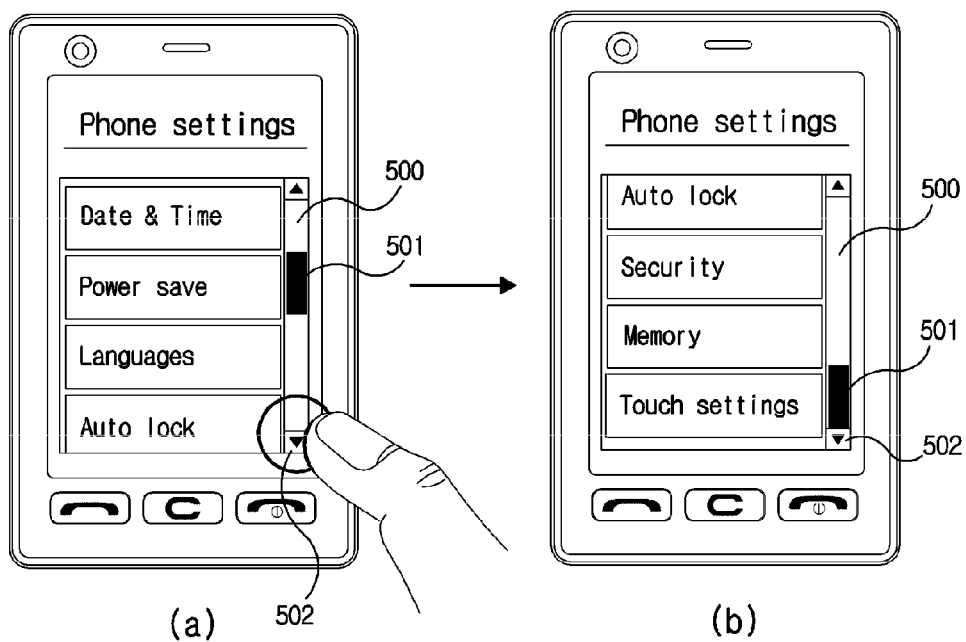
FIG. 5 is an image drawing for illustrating a method for processing a touch signal in a mobile terminal according to a second exemplary embodiment of the present invention.

FIG. 5a is an image drawing for illustrating a method for processing a touch signal in a terminal in a case a scroll bar is displayed on the touch screen.

In a case a user inputs a display signal for displaying data, the controller 180 displays data, a scroll bar 500, a scroll box 501 and a direction scroll key 502 (see FIG. 5a).

The scroll box 501 displays a relative position of a currently displayed data in the whole data. The direction scroll key 502 may be displayed as a down direction scroll key or an up direction scroll key. The user uses the pointing device to strongly touch the direction scroll key 502. Then, the terminal shaking detection sensor detects a shaking intensity of the terminal in response to the touch to generate a shaking detection signal.

Successively, the terminal shaking detection sensor transmits the shaking detection signal to the controller 180. If the detected shaking intensity is greater than a predetermined shaking intensity based on the shaking detection signal, the controller 180 scrolls the data screen to the lowest bottom and displays the data screen on the touch screen {see FIG. 5a (b)}. Meanwhile, if the detected shaking intensity is smaller than a predetermined shaking intensity based on the shaking detection signal, the controller 180 scrolls the data screen within a predetermined range and displays on the touch screen as the direction scroll key 502 has been touched once. As a result, the user can conveniently scroll the data screen to the lowest bottom position or the uppermost position.

FIG. 5a is an image drawing for illustrating a method for processing a touch signal in a terminal in a case page up/page down icons are displayed on the touch screen.

Figure 5B:
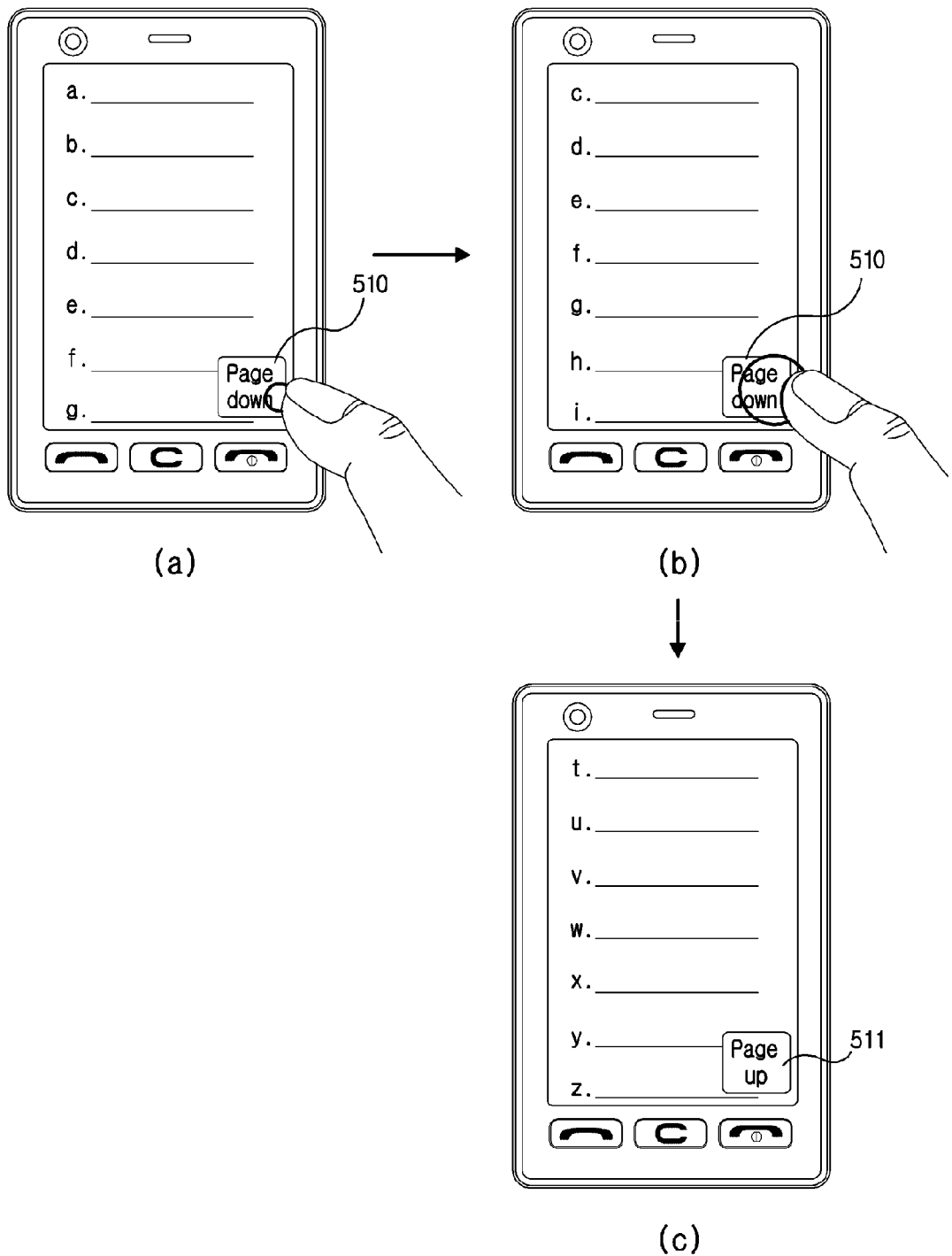

In a case the user inputs a display signal for displaying data, the controller 180 displays data and page down icon 510 on the touch screen {see FIG. 5b (a)}. where the page down icon 510 and the page up icon may be displayed as well. The user uses a pointing device to touch the page down icon 510. Then, the terminal shaking detection sensor detects a shaking intensity of the terminal in response to the touch to generate a shaking detection signal. Next, the terminal shaking detection sensor transmits the shaking detection signal to the controller 180.

If the detected shaking intensity is smaller than ('less than a predetermined intensity') a predetermined shaking intensity based on the shaking detection signal, the controller 180 may page-down within a predetermined range and display on the touch screen {see FIG. 5b (b)}.

Next, the user uses the pointing device to strongly touch the page down icon 510. The terminal shaking detection sensor detects the shaking intensity in response to the touch to generate a shaking detection signal. Next, the terminal shaking detection sensor transmits the shaking detection signal to the controller 180.

If the detected shaking intensity is larger than ('larger than a predetermined intensity') a predetermined shaking intensity based on the shaking detection signal, the controller 180 displays the lowest bottom page on the touch screen {see FIG. 5b (c)}. Furthermore, the controller 180 displays the page up icon 511 on the touch screen. The user uses the page up icon to implement the page-up. As a result, the user can view the uppermost page or the lowest bottom page at one time.

Figure 5C:
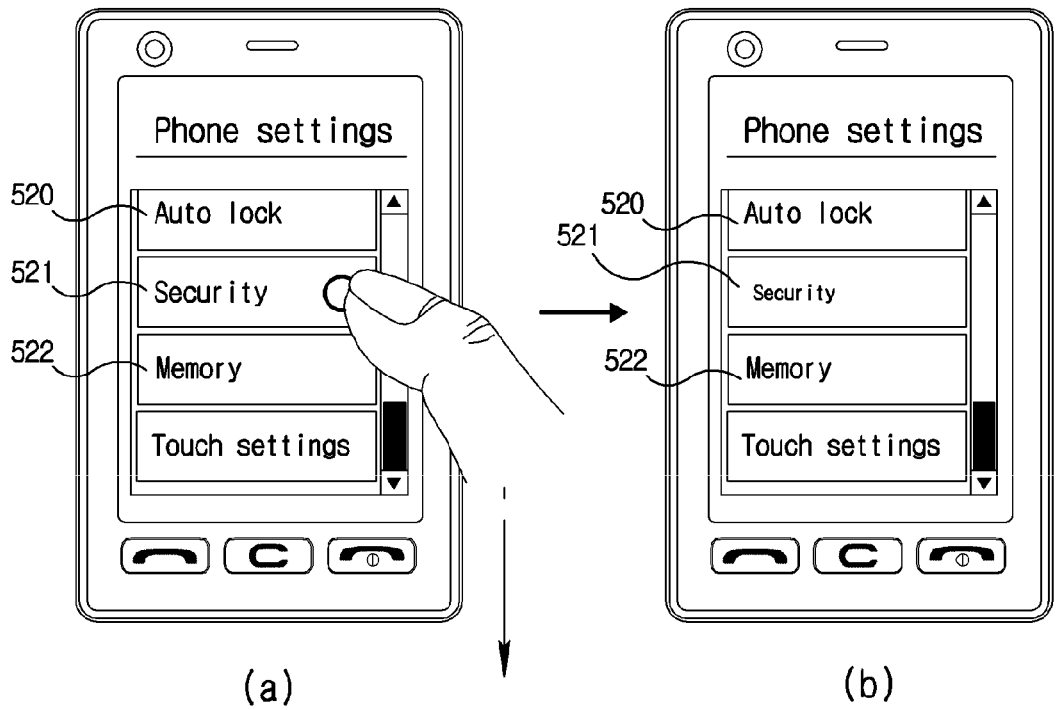
Figure 5D:
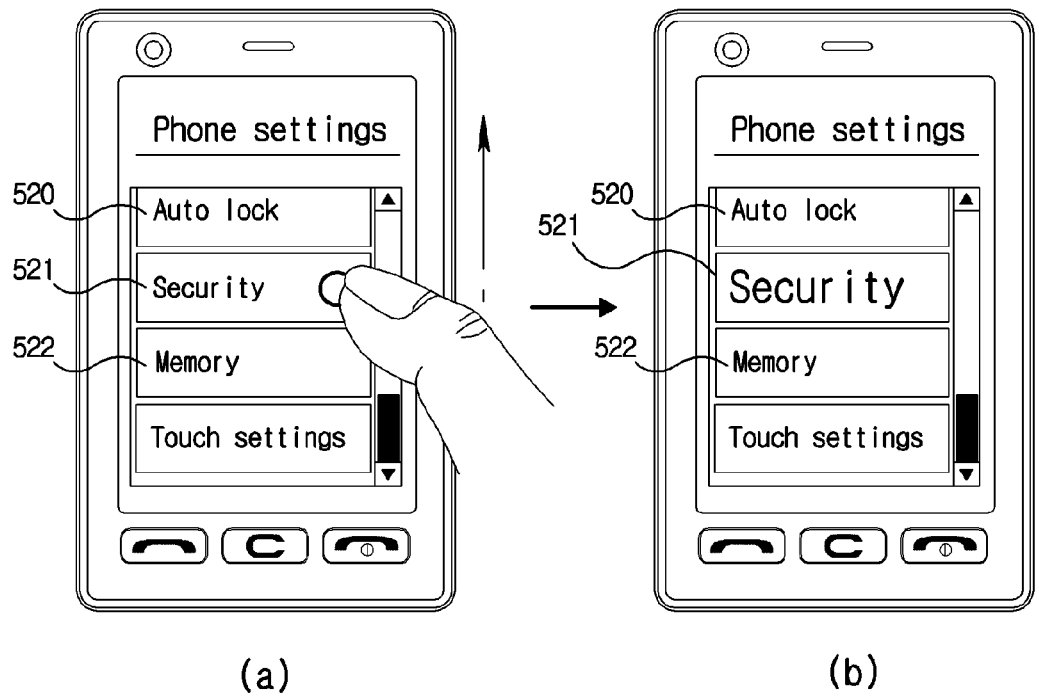

FIGS. 5c and 5d are image drawings for illustrating a method for processing a touch signal in a terminal capable of changing a display size of data.

In a case a user inputs a display signal for displaying data, the controller 180 displays data 520, 5221, 522 on the touch screen {see FIG. 5c (a)}.

The user may shake the terminal downward while using a pointing device to touch one of the data 521 out of the data 520, 521, 522.

The terminal shaking detection sensor detects the shaking of the terminal to generate a shaking detection signal. The terminal shaking detection sensor transmits the shaking detection signal to the controller 180. The controller 180 reduces the display size of the data 521 and displays the reduced data on the touch screen based on the shaking detection signal ('shaking downward') {see FIG. 5c (b)}.

On the other hand, the terminal is shaken upward while the user uses a pointing device to touch one of the data 521 out of the data 520, 521, 522. The terminal shaking detection sensor detects the shaking of the terminal to generate a shaking detection signal. The terminal shaking detection sensor transmits the shaking detection signal to the controller 180. The controller 180 enlarges the display size of the data 521 based on the shaking detection signal ('shaking upward') and displays the enlarged size of data on the touch screen {see FIG. 5d (b)}.

Although the above-mentioned description has described the shaking direction of the terminal for reducing or enlarging the display size of the data based on up/down, the description is not limited thereto. For example, various descriptions such as left, right and diagonal direction may be implemented.

In another example, if the user uses the pointing device to touch one 521 of the data, all the data displayed on the touch screen may be selected. Next, if the user shakes the terminal up or down, the controller 180 may display the displayed size of all the data displayed on the touch screen in a reduced size or an enlarged size. As a result, the user can easily change the displayed size of all the displayed data or a desired data.

In the following, description of process for detecting the touch intensity will be omitted as it has been already described above.

FIG. 6 is an image drawing for illustrating a method for processing a touch signal in a mobile terminal according to a third exemplary embodiment of the present invention.

Figure 6A:
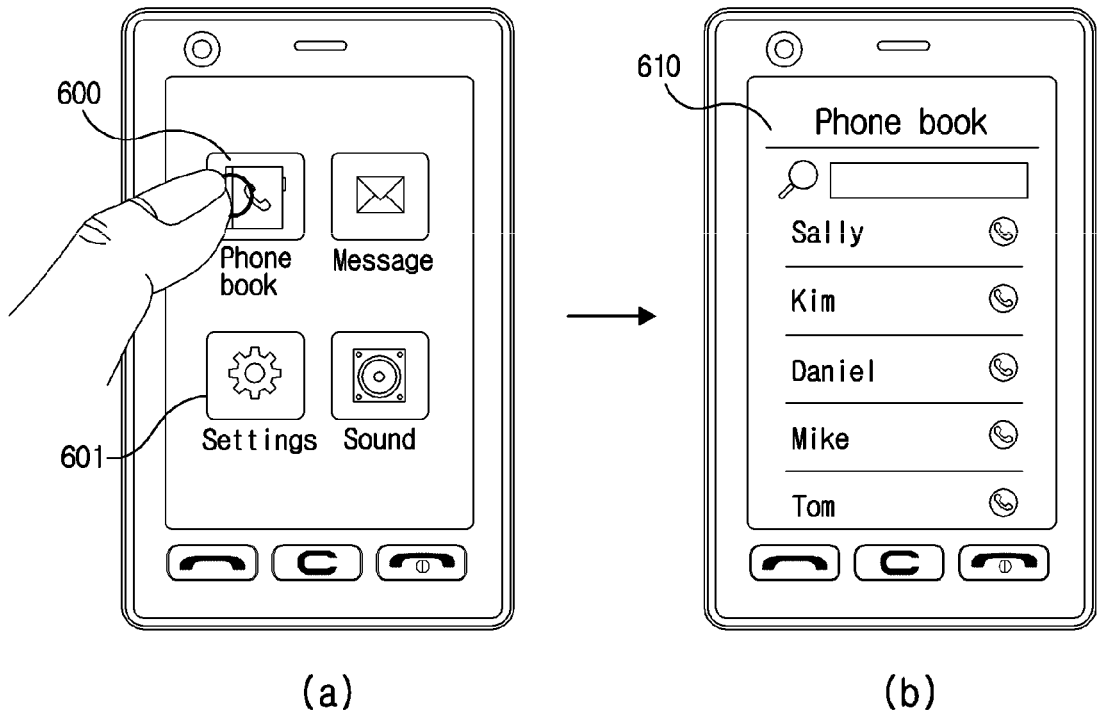
FIG. 6 is an image drawing for illustrating a method for processing a touch signal in a mobile terminal according to a third exemplary embodiment of the present invention.

FIG. 6a illustrates an image drawing for explaining a method for processing a touch signal in a case a phonebook icon is weakly touched ('less than a predetermined intensity').

If the user inputs an icon display signal for displaying icons, the controller 180 displays the icons 600, 601 on the touch screen {see FIG. 6a (a)}. The user uses the pointing device to weakly touch one 600 of the icons. The controller 180 displays a phonebook menu screen 610 on the touch screen. The phonebook menu screen 610 may include contact lists.

Figure 6B:
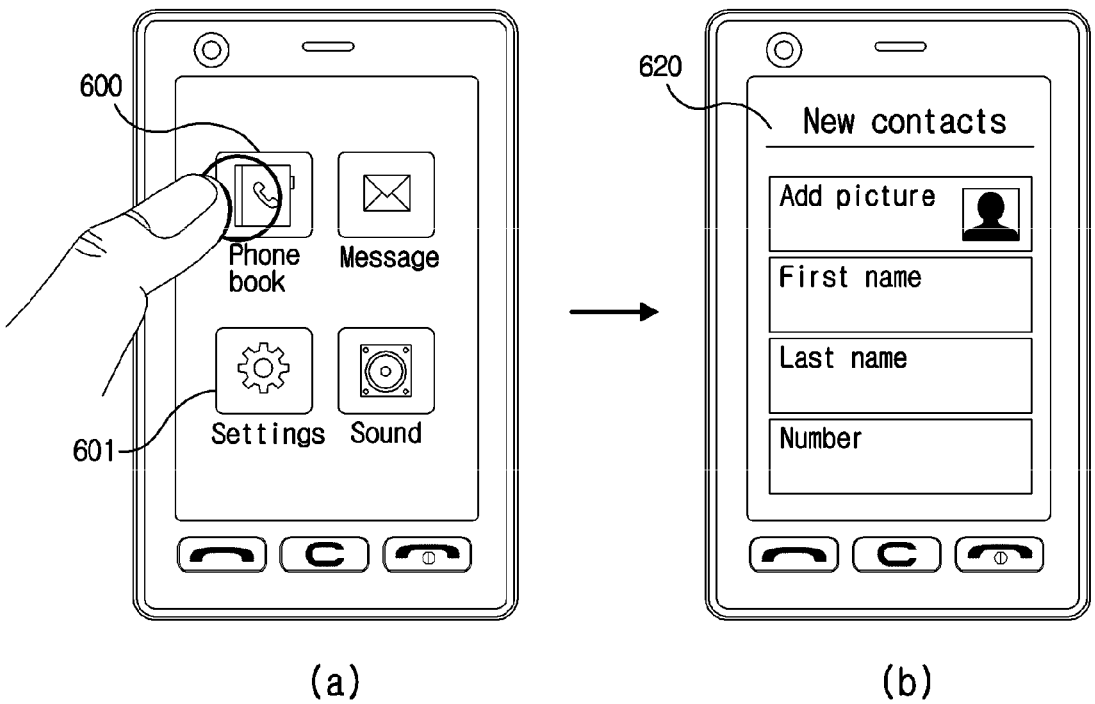

FIG. 6b illustrates an image drawing for explaining a method for processing a touch signal in a case a phonebook icon is strongly touched ('stronger than a predetermined intensity').

If the user inputs an icon display signal for displaying icons, the controller 180 displays the icons 600, 601 on the touch screen {see FIG. 6a (a)}. The user uses the pointing device to strongly touch one 600 of the icons. Then, the controller 180 displays a new contact list added screen 620 on the touch screen. The new contact list added screen 620 may include a name input column, a telephone number input column, a photo added input column and the like. In case of a strong touch, the display of new contact list added screen 620 is just an example, and other functions in the phone book list may be implemented.

In the present exemplary embodiment, although description is based on the phone book, various functions applicable to the mobile terminal may be used that include message preparation and transmission, alarm set-up and the like. That is, the touch intensity may be divided into one or more intensities, and function of the terminal is matched to a corresponding divided intensity, whereby the user can conveniently implement a particular function. As a result, the user may implement a desired function by diversifying the intensity of touch.

FIG. 7 is an image drawing for illustrating a method for processing a touch signal in a mobile terminal according to a fourth exemplary embodiment of the present invention.

Figure 7A:
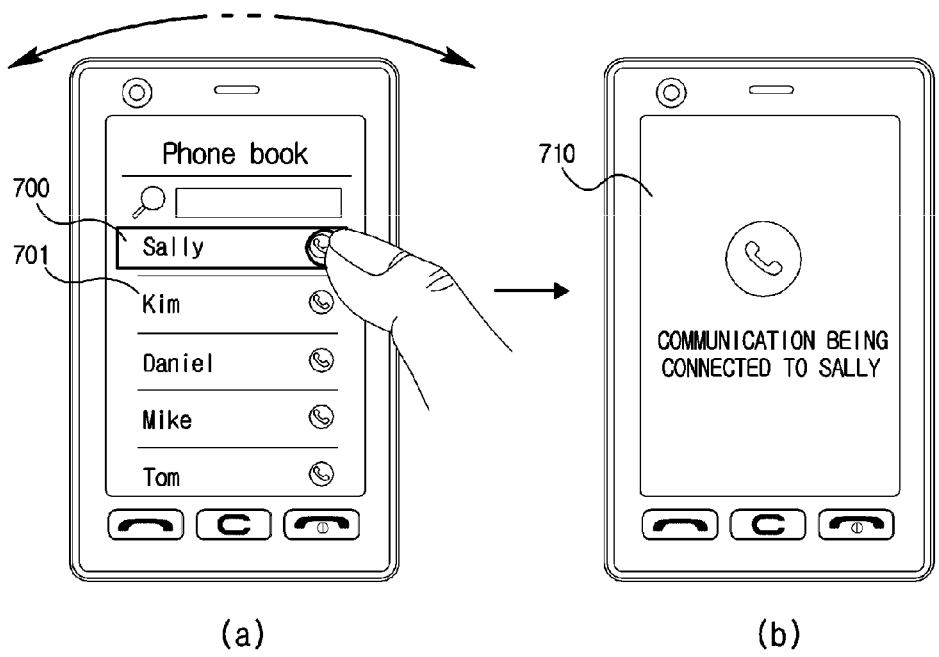
FIG. 7 is an image drawing for illustrating a method for processing a touch signal in a mobile terminal according to a fourth exemplary embodiment of the present invention.

FIG. 7a is a schematic view illustrating a method for processing a touch signal in a terminal in a case the user shakes the terminal just once.

If the user inputs a display signal for displaying the contact lists, the controller 180 displays contact icons 700, 701 on the touch screen. The user uses the pointing device to touch one 700 of the contact icons and shakes the terminal just once {see FIG. 7a (a)}.

The terminal shaking sensor detects the shaking frequency of the terminal to generate a shaking detection signal and transmits the signal to the controller 180. Then, the controller 180 transmits a call signal to the terminal corresponding to the contact icon based on the detection signal ('one time shaking'). At this time, the controller 180 displays a communication connection message 710 on the touch screen {see FIG. 7a (b)}.

FIG. 7a is a schematic view illustrating a method for processing a touch signal in a terminal in a case the user shakes the terminal twice.

Figure 7B:
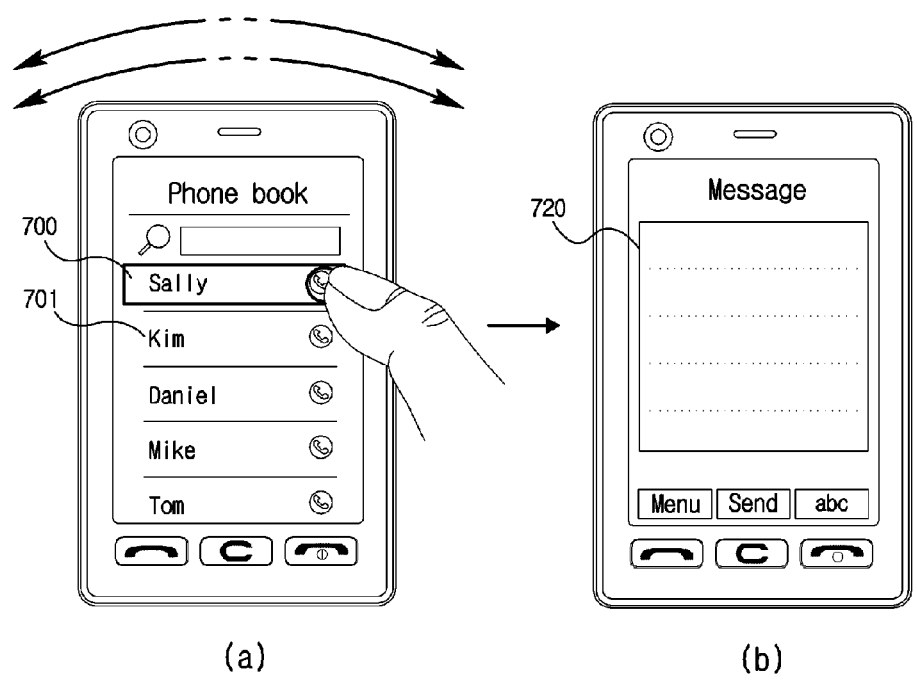

The user uses the pointing device to touch one 700 ('Sally') of the contact icons and shakes the terminal twice {see FIG. 7b (a)}. The terminal shaking sensor detects the shaking frequency of the terminal to generate a shaking detection signal and transmits the signal to the controller 180. Then, the controller 180 displays on the touch screen a message screen 720 for preparing a message to be sent to the terminal corresponding to the contact icon 700 based on the detection signal ('twice shaking') {see FIG. 7b (b)}.

The message screen 720 may include a message window for inputting a message content and a file attachment window for attaching a file. The telephone number of the terminal corresponding to the contact icon 700 may be automatically inputted, where it should be natural that the shaking frequency and functions implemented in response to the shaking frequency may be variably changed.

As a result, the user varies the shaking frequency of the terminal to enable a desired function to be easily implemented.

Figure 8:
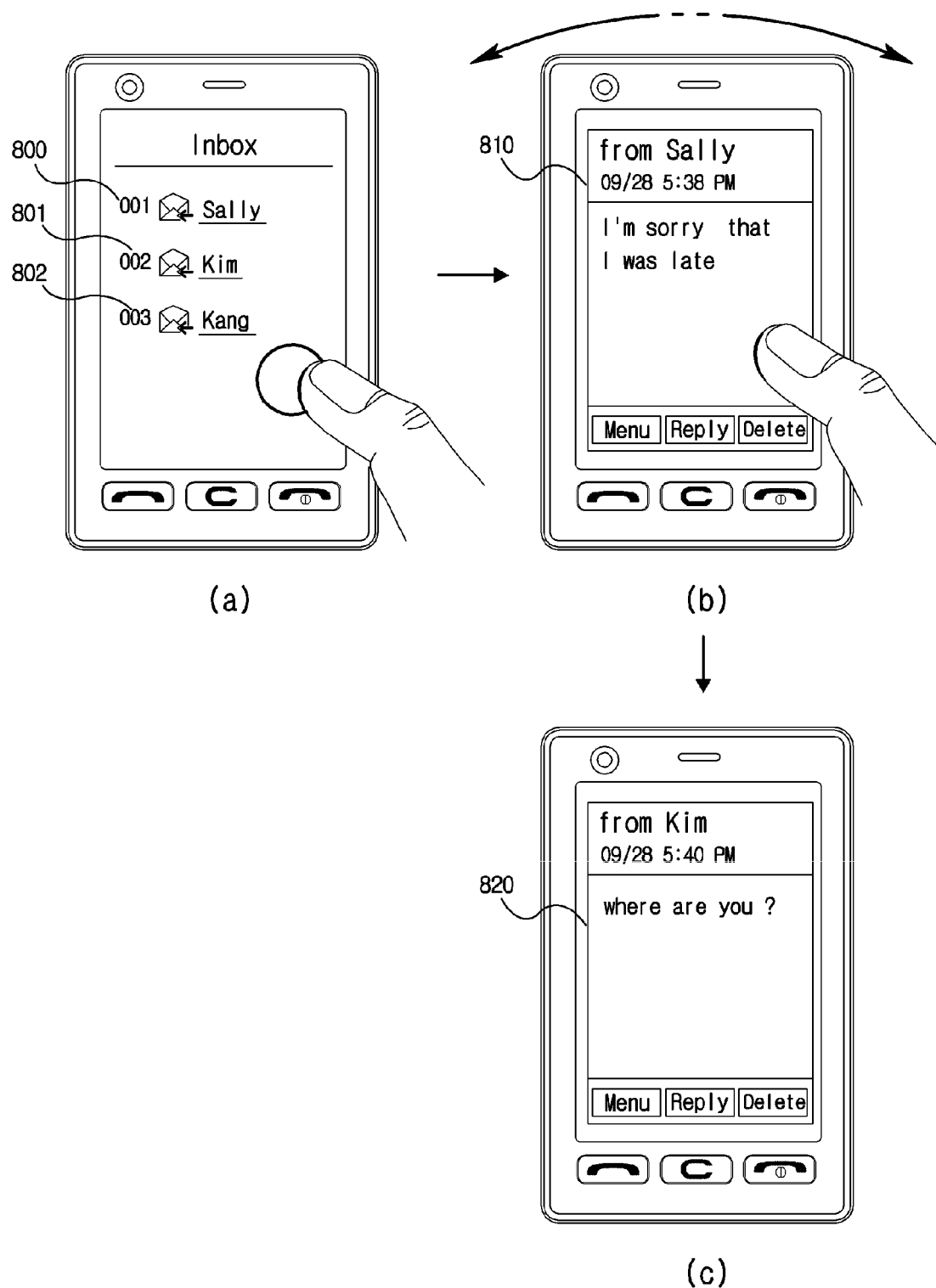
FIG. 8 is an image drawing for illustrating a method for processing a touch signal in a mobile terminal according to a fifth exemplary embodiment of the present invention.

FIG. 8 is an image drawing for illustrating a method for processing a touch signal in a mobile terminal according to a fifth exemplary embodiment of the present invention.

In a case the user inputs a message mailbox display signal for displaying a message mailbox, the controller 180 displays message icons 800, 801, 802 on the touch screen {see FIG. 8(a)}.

In a case the user uses the pointing device to strongly touch the touch screen, the controller 180 displays on the touch screen a screen 810 including a message content corresponding to the first message icon 800 {see FIG. 8(b)}. Successively, in a case the user maintains the touched state to shake the terminal, the controller 180 displays on the touch screen a screen 820 including a message content corresponding to the second message icon 801 {see FIG. 8(c)}.

In another example, in a case the user employs the pointing device to strongly touch the touch screen, the controller 180 may select all the message icons 800, 801, 802. Next, in a case the user shakes the terminal in a state of touching the touch screen ('holding'), the controller 180 displays on the touch screen a message content corresponding to the first message icon 800. The next process is the same as that of the above-explained exemplary embodiment. As a result, the user can conveniently check the message included in the mailbox.

FIG. 9 is an image drawing for illustrating a method for processing a touch signal in a mobile terminal according to a sixth exemplary embodiment of the present invention.

In a case the user inputs a multimedia message display signal for transmitting a multimedia message, the controller 180 displays a multimedia message menu screen on the touch screen {see FIG. 9(a)}. The multimedia message menu screen may include a message window 910 and a file attachment window 920. The user attaches files 921, 922 through the file attachment window 920. Next, in a case the user uses the pointing device to strongly touch the touch screen and shakes the terminal, the controller 180 displays a preview screen of the files 921, 922 on the touch screen {see FIG. 9(b)}.

Successively, in a case the user shakes the terminal in a state of touching the touch screen, the controller 180 displays the multimedia message menu screen {see FIG. 9(c)}. That is, FIG. 9b returns to FIG. 9a. As a result, the user can easily check the preview screen of attachment files.

Figure 10:
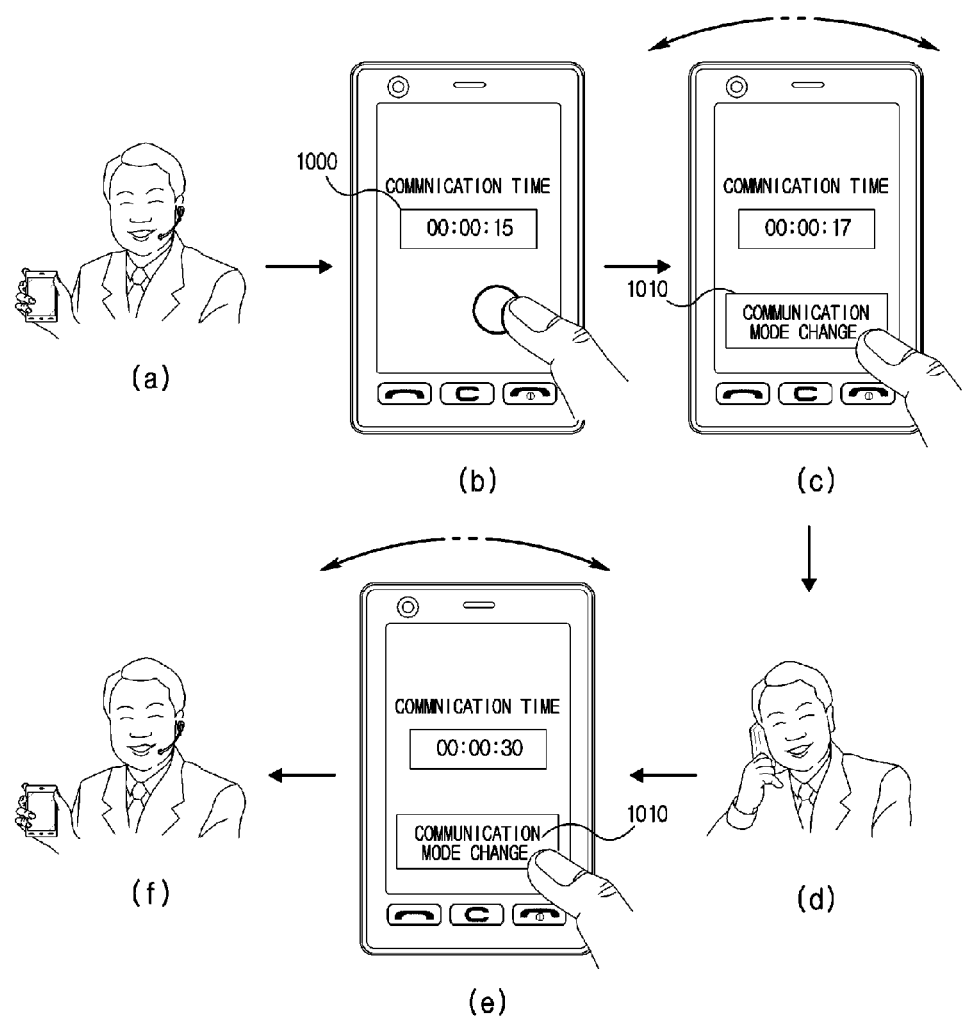
FIG. 10 is an image drawing for illustrating a method for processing a touch signal in a mobile terminal according to a seventh exemplary embodiment of the present invention.

FIG. 10 is an image drawing for illustrating a method for processing a touch signal in a mobile terminal according to a seventh exemplary embodiment of the present invention.

FIG. 10a illustrates a state where a user uses a Bluetooth headset to perform a telephone communication.

In a case the user uses the pointing device to strongly touch the touch screen during the telephone communication, the controller 180 displays a communication mode change 1010 icon on the touch screen {see FIG. 10(b)}. The touch screen may further display a communication time display window 1000 for notifying the communication time.

Next, in a case the user shakes the terminal in a state the communication mode change 1010 icon is being touched, the controller 180 changes the mode of the terminal to a communication mode from which communication can be implemented {see FIG. 10(c)}, whereby the user can use the terminal to implement the telephone communication {see FIG. 10(d)}.

Successively, in a case the user shakes the terminal in a state the communication mode change 1010 icon is being touched, the controller 180 changes the mode of the terminal to a communication mode from which communication can be conducted using a Bluetooth headset {see FIG. 10(e)}. That is, FIG. 10b returns to FIG. 10a. As a result, the user can easily change the communication mode.

Figure 11:
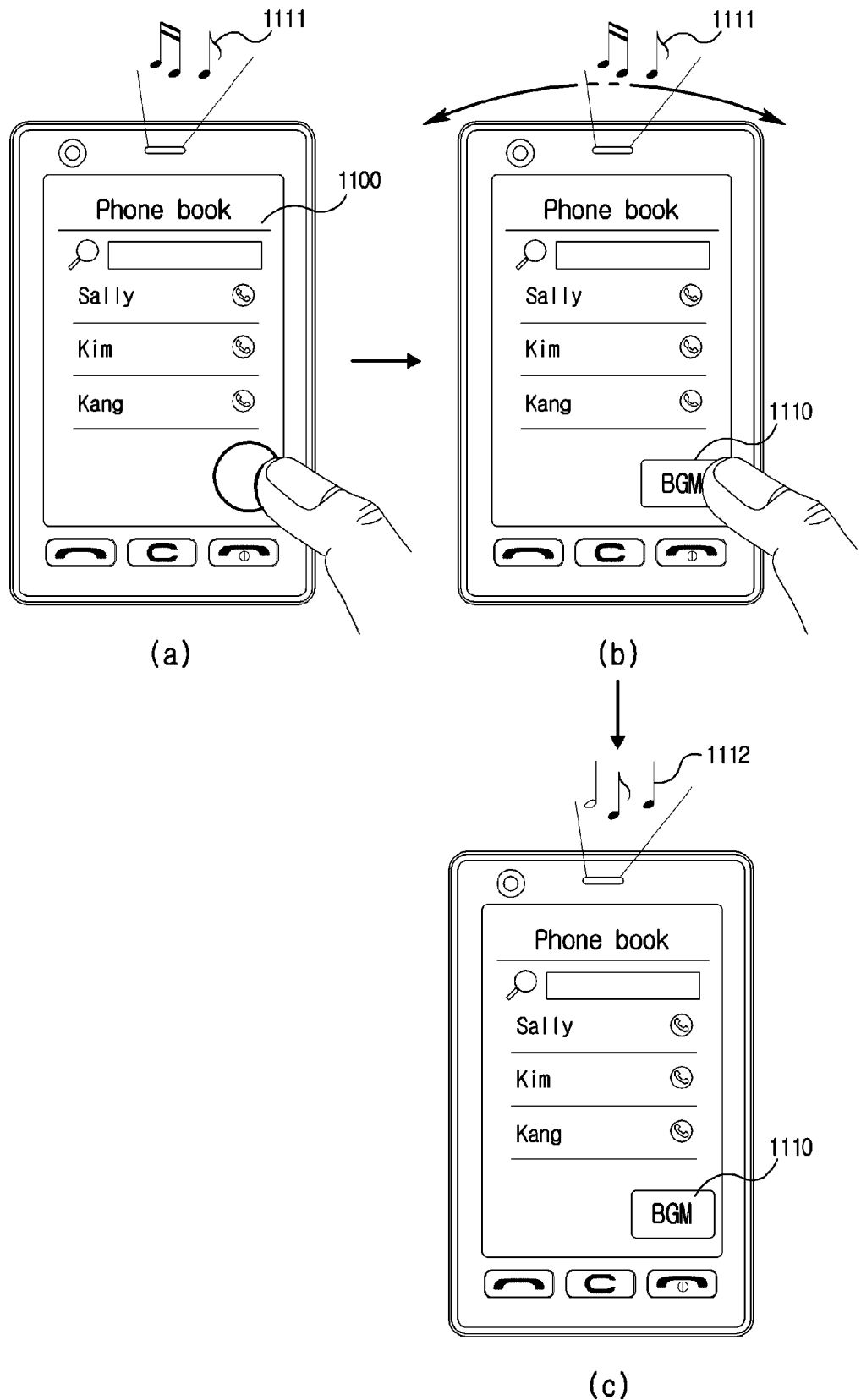
FIG. 11 is an image drawing for illustrating a method for processing a touch signal in a mobile terminal according to an eighth exemplary embodiment of the present invention.

FIG. 11 is an image drawing for illustrating a method for processing a touch signal in a mobile terminal according to an eighth exemplary embodiment of the present invention.

The user can simultaneously implement a phone book menu and a first background music (BGM). The controller 180 may display the phone book menu only on the touch screen while information on the first background music is not displayed on the touch screen {see FIG. 11 (a)}.

Successively, in a case the user uses the pointing device to strongly touch the touch screen, the controller 180 displays a BGM icon 1110 on the touch screen. In a case the user shakes the terminal in a state the BGM icon 1110 is being touched, the controller 180 outputs a second BGM 1112 via the audio output module 152. Next, in a case the user shakes the terminal in a state the BGM icon 1110 is being touched, the controller 180 outputs a third BGM via the audio output module 152. As a result, the user can easily change the BGM without going through a complex process.

Figure 12:
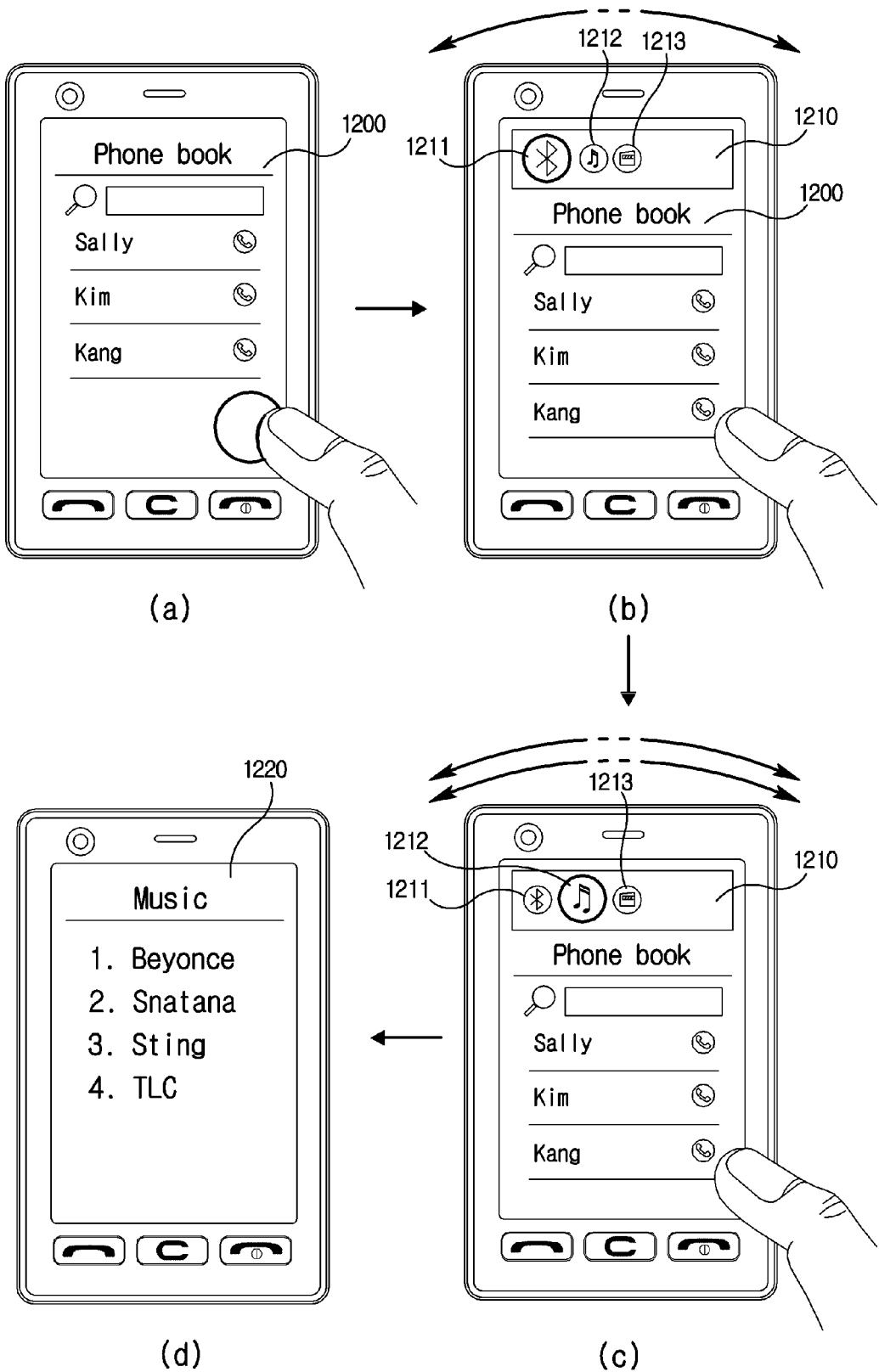
FIG. 12 is an image drawing for illustrating a method for processing a touch signal in a mobile terminal according to a ninth exemplary embodiment of the present invention.

FIG. 12 is an image drawing for illustrating a method for processing a touch signal in a mobile terminal according to a ninth exemplary embodiment of the present invention.

The user can simultaneously implement a phone book menu 1200 and background applications {see FIG. 12 (a)}. The background applications may be background music, Bluetooth and the like. Next, in a case the user uses the pointing device to strongly touch the touch screen, the controller 180 displays on the touch screen an application window 1210 including icons 1211, 1212, 1213 representing the background application currently under implementation, where the icon 1212 may represent a Bluetooth function, the icon 1213 may represent a music list indicating function and the icon 1213 may represent an icon representing a function implementing the DMB (digital multimedia broadcasting). However, these are just examples.

In a case the user shakes the terminal one time while touching the touch screen, the controller 180 causes a selected icon to be changed from the first icon 1211 to the second icon 1212 {see FIG. 12(b)}. Successively, in a case the user shakes the terminal two times while touching the touch screen, the controller 180 executes a function corresponding to the second icon 1212 which is currently selected {see FIGS. 12(c) and (d)}. That is, the controller 180 displays a music list screen 1220 on the touch screen. The function corresponding to the second icon 1212 is a function indicating the music list.

In another example, the icons 1211, 1212, 1213 may be selected by a user's direct touch. As a result, the user can easily grasp the types of background applications and easily select and execute the background applications.

Figure 13:
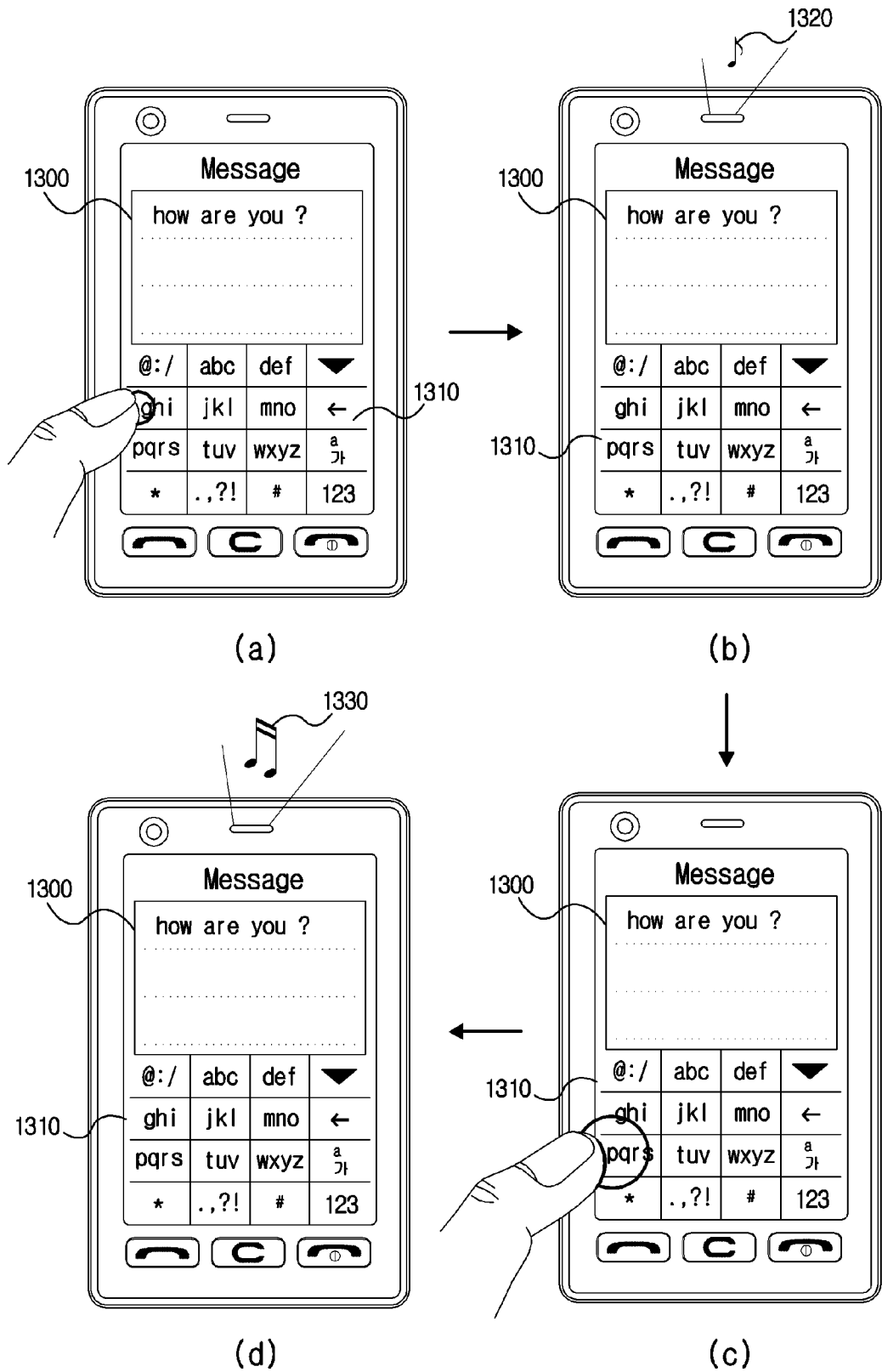
FIG. 13 is an image drawing for illustrating a method for processing a touch signal in a mobile terminal according to a tenth exemplary embodiment of the present invention.

FIG. 13 is an image drawing for illustrating a method for processing a touch signal in a mobile terminal according to a tenth exemplary embodiment of the present invention.

In a case the user inputs a message display signal for transmitting a message, the controller 180 displays a message menu screen on the touch screen {see FIG. 13(a)}. The message menu screen may include a message window 1300 and a key board 1310.

In a case the user employs a pointing device to softly touch one key of the key board 1310, the controller 180 outputs a low-pitch audio signal or a small audio signal 1320 via the audio output module 152 {see FIG. 13(b)}. In a case the user employs a pointing device to strongly touch one key of the key board 1310, the controller 180 outputs a high-pitch audio signal or a strong audio signal 1320 via the audio output module 152 {see FIGS. 13(*c*) and 13(*d*)}. That is, the controller 180 can variably output low-pitch/high-pitch, small/big sound, a time to output and tone color in response to the shaking intensity. Therefore, the present exemplary embodiment can provide the user with an interest to the touch input because different sounds can be outputted according to the shaking intensity.

Figure 14:
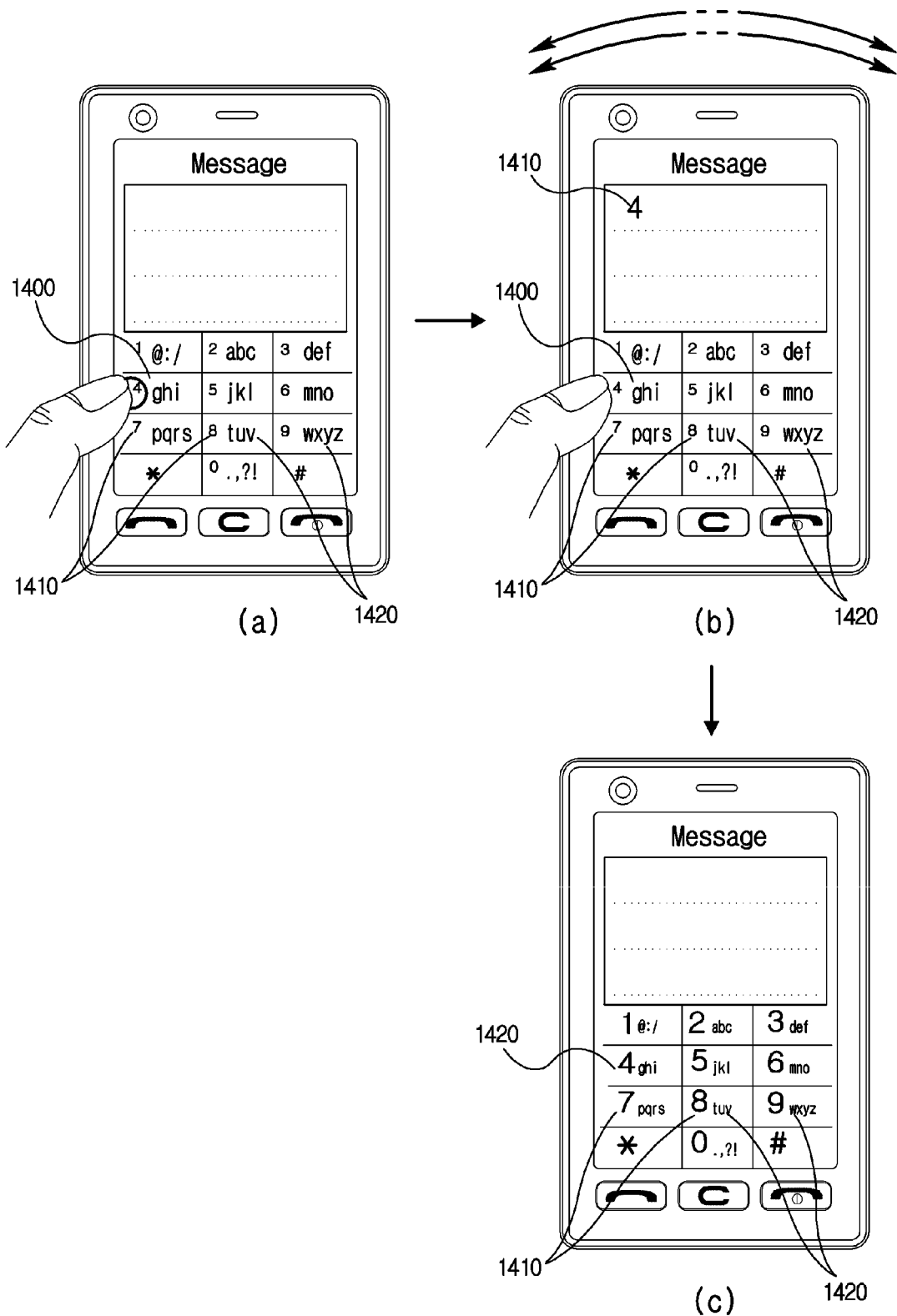
FIG. 14 is an image drawing for illustrating a method for processing a touch signal in a mobile terminal according to an eleventh exemplary embodiment of the present invention.

FIG. 14 is an image drawing for illustrating a method for processing a touch signal in a mobile terminal according to an eleventh exemplary embodiment of the present invention.

In a case the user inputs a message display signal for transmitting a message, the controller 180 displays a message menu screen on the touch screen {see FIG. 14(*a*)}. The message menu screen may include a message window and a key board. The key board is simultaneously displayed with a first key 1410 ('number key') and a second key 1420 ('English small letter'). FIG. 14(*a*) shows that the second key 1420 is activated.

Next, in a case the user employs a pointing device to strongly touch one key 1400 of the key board, the controller 180 does not input 'a' letter corresponding to the second key 1420 on the message window, but '4' letter corresponding to the first key 1410 on the message window {see FIG. 14(*b*)}.

Successively, in a case the user employs a pointing device to shake the terminal while keeping the touched state, the controller 180 deactivates the second key 1420 to activate the first key 1410 {see FIG. 14(*c*)}. Next, in a case the user employs a pointing device to shake the terminal while keeping the touched state, the controller 180 deactivates the first key 1410 but activates a third key ('special symbol'). At this time, the touch screen may be displayed with the first and third keys, or the second and third keys.

In another example, in a case the user employs a pointing device to strongly touch one key 1400 of the key board, the controller 180 deactivates the second key to activate the first key. At the same time, the controller 180 does not input 'a' letter corresponding to the second key on the message window, but '4' letter corresponding to the first key on the message window. As a result, the user can easily input letters on other keys and can easily change the key as well.

Figure 15:
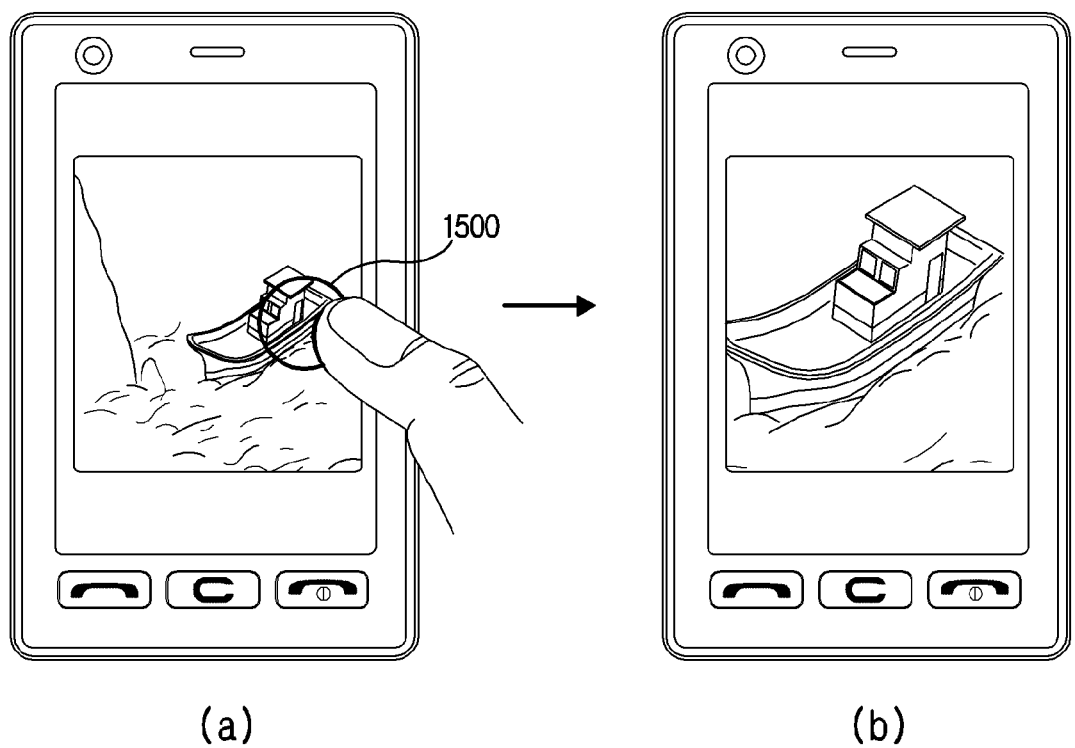
FIG. 15 is an image drawing for illustrating a method for processing a touch signal in a mobile terminal according to a twelfth exemplary embodiment of the present invention.

FIG. 15 is an image drawing for illustrating a method for processing a touch signal in a mobile terminal according to a twelfth exemplary embodiment of the present invention.

In a case the user inputs a display signal for displaying an image data, the controller 180 displays the image data {see FIG. 15(*a*)}. Next, in a case the user touches a position 1500 desired to be enlarged out of the image data. Then, the controller 180 enlarges a portion corresponding to the touched position and displays the portion on the touch screen. That is, the controller 180 does not enlarge the whole image data but enlarge a portion corresponding to a position touched by the user. Although the above-mentioned has explained the case of enlarging, the present exemplary embodiment can be also applied to a case of reduction. As a result, the user can enlarge or reduce only a portion desired to be enlarged or reduced by the user out of the image data.

Figure 16:
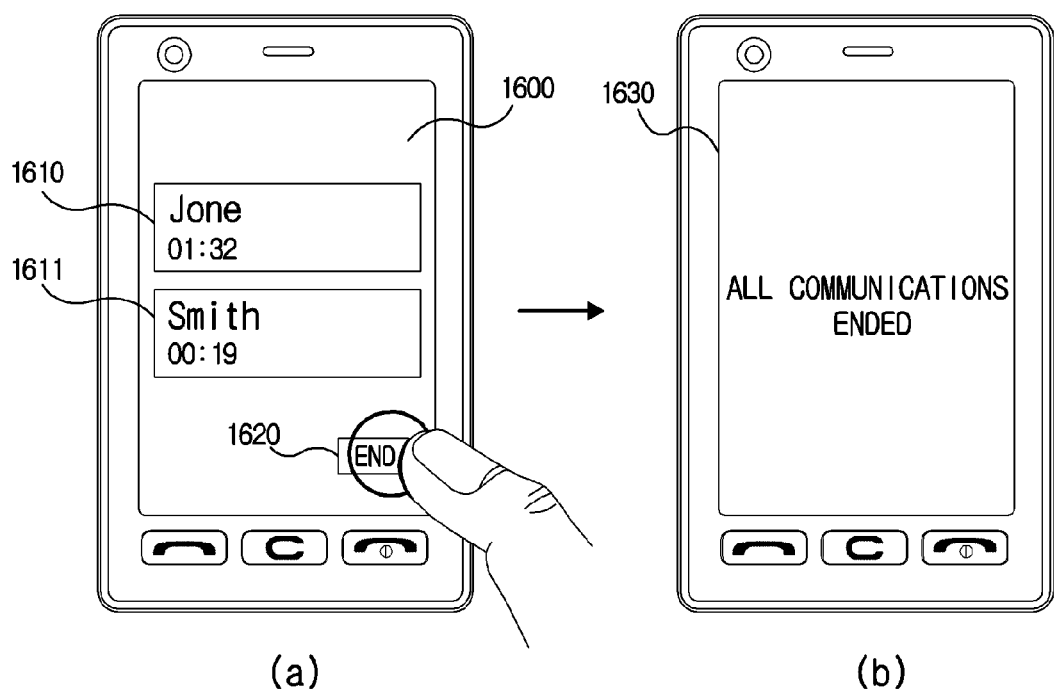
FIG. 16 is an image drawing for illustrating a method for processing a touch signal in a mobile terminal according to a thirteenth exemplary embodiment of the present invention.

FIG. 16 is an image drawing for illustrating a method for processing a touch signal in a mobile terminal according to a thirteenth exemplary embodiment of the present invention.

FIG. 16(*a*) is a schematic view illustrating a multilateral communication screen 1600 displayed on the terminal, in a case the user performs communications with a plurality of people. The multilateral communication screen 1600 is displayed with a first display window 1610 including information and communication time of a first communicator, a second display window 1611 including information and communication time of a second communicator and a communication completion icon 1620.

In a case the user employs a pointing device to strongly touch the communication completion icon 1620, the controller 180 ends all the communications, and displays all the communication completion messages on the touch screen. As a result, the user can end the communications in a package deal instead of ending the communications individually.

Figure 17:
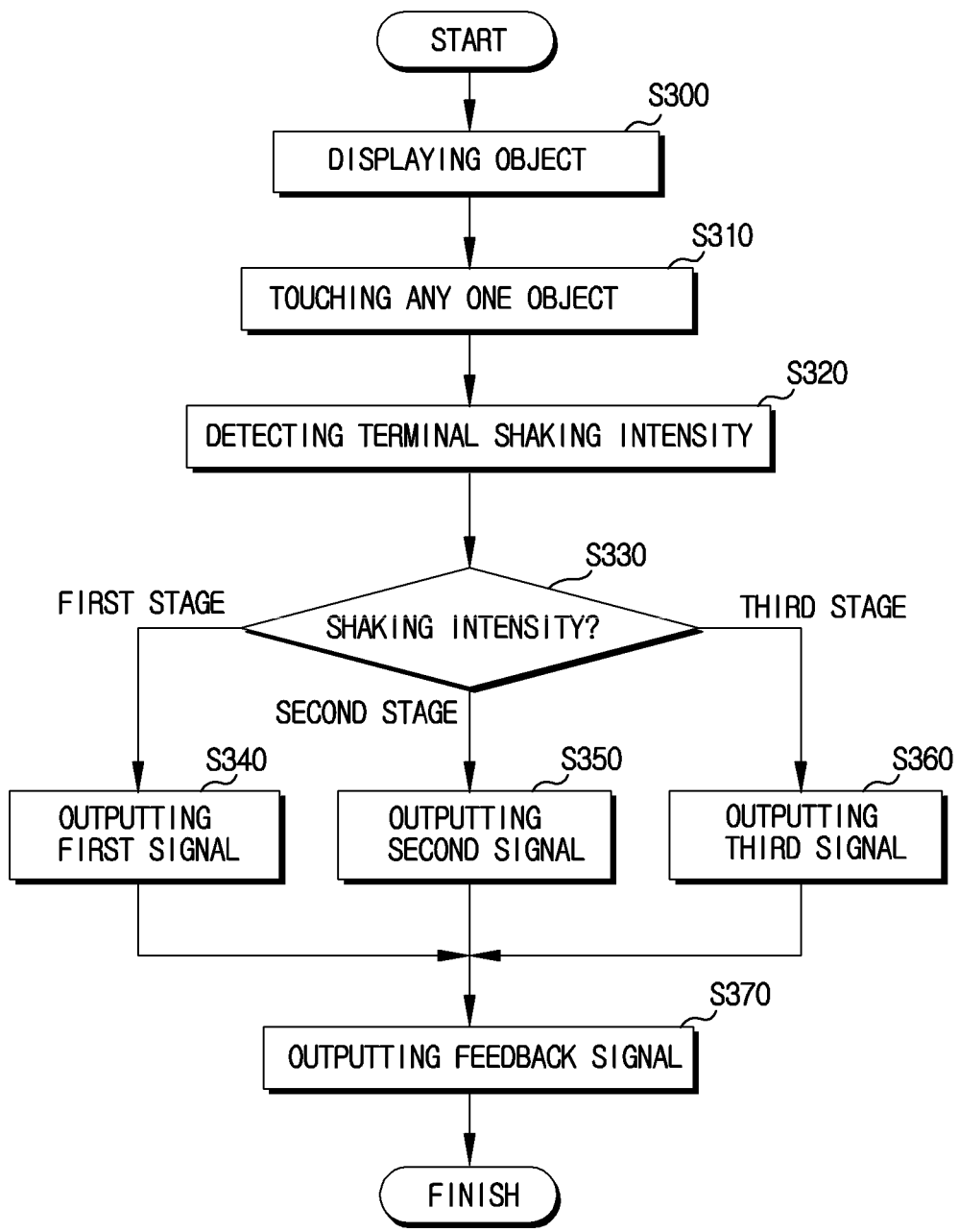
FIG. 17 is a flowchart illustrating a method for processing a touch signal in a mobile terminal according to an exemplary embodiment of the present disclosure.

FIG. 17 is a flowchart illustrating a method for processing a touch signal in a mobile terminal according to an exemplary embodiment of the present disclosure.

Referring to FIG. 17, the controller 180 displays an object on the touch screen (S300). The object may be an icon, an item, a window and an image. The image may define an entire image screen displayed on the touch screen, or a part of the entire image screen displayed on the touch screen.

The user touches one of the objects displayed on the touch screen (S310). The terminal shaking detection sensor detects a shaking intensity of the terminal in response to the touch to generate a detection signal (S320). The terminal shaking detection sensor transmits the detection signal to the controller 180.

The terminal shaking detection sensor may include a gyro sensor 142, an acceleration speed sensor 143 which is a sensor capable of detecting the shaking of the terminal.

The controller 180 determines the shaking intensity based on the detection signal (S330). The controller 180 may determine the shaking intensity by dividing in several stages.

That is, the controller 180 can determine the shaking intensity by dividing into a first stage, a second stage and a third stage. The controller 180 outputs mutually different output signals in response to the shaking intensity (S340, S350, S360). The mutually different output signals may include a first signal, a second signal and a third signal. The number of mutually different output signals are not limited to the three but may be changed in various ways.

The controller 180 outputs feedback signals each corresponding to the mutually different output signals (S370). The feedback signal is a signal notifying to the user whether the touch has been normally implemented, or what signal has been inputted. The mutually different output signals and feedback signals may be at least one of an image shaking, a vibration intensity and an audio intensity, where one of them is used and outputted.

For example, the shaking intensity may be categorized into three ranges. In a case the shaking intensity corresponds to a first range, the first signal may be a weak vibration, in a case the shaking intensity corresponds to a second range, the second signal may be an intermediate vibration, and in a case the shaking intensity corresponds to a third range, the third signal may be a strong vibration.

In another example, the shaking intensity may be divided into three ranges. In a case the shaking intensity corresponds to a first range, the first signal may be a vibration signal, in a case the shaking intensity corresponds to a second range, the second signal may be an audio signal, and in a case the shaking intensity corresponds to a third range, the third signal may be an image shaking Detailed content on the mutually different output signals and feedback signals will be described with reference to FIGS. 18 to 24.

FIG. 18 is an image drawing for illustrating a method for processing a touch signal in a mobile terminal according to a fourteenth exemplary embodiment of the present invention.

FIGS. 18 (*a*) and (*b*) are image drawings for explaining a case where the user weakly touches the image. In the present exemplary embodiment, the shaking intensity of the terminal may be categorized into two ranges. In a case the shaking intensity corresponds to a first range, the controller 180 controls the alarm 153 to output a weak vibration. In a case the shaking intensity corresponds to a second range, the controller 180 displays on the touch screen an automobile game including a pedal image 2405 {see FIG. 18(*a*)}. At this time, the user softly touches the displayed pedal image 2405.

The terminal shaking intensity detection sensor detects the shaking intensity in response to the touch to generate a detection signal. The terminal shaking intensity detection sensor transmits the detection signal to the controller 180. The controller 180 identifies the shaking intensity as corresponding to a first range based on the detection signal, and slowly accelerates the displayed automobile. The controller 180 identifies the shaking intensity as corresponding to a first range based on the detection signal and may control the alarm 153 to output a weak vibration {see FIG. 18(*b*)}.

FIGS. 18 (*c*) and (*d*) are image drawings for explaining a case where the user weakly touches the image. The controller 180 displays on the touch screen an automobile game including a pedal image 2405 {see FIG. 18(*c*)}. At this time, the user strongly touches the displayed pedal image 2405.

The terminal shaking intensity detection sensor detects the shaking intensity in response to the touch to generate a detection signal. The terminal shaking intensity detection sensor transmits the detection signal to the controller 180. The controller 180 identifies the shaking intensity as corresponding to a second range based on the detection signal, and rapidly accelerates the displayed automobile. The controller 180 identifies the shaking intensity as corresponding to the second range based on the detection signal and may control the alarm 153 to output a strong vibration {see FIG. 18(*d*)}. The method of outputting the feedback signals may use audio output and signal outputting methods in addition to the vibration outputting method.

FIG. 19 is an image drawing for illustrating a method for processing a touch signal in a mobile terminal according to a fifteenth exemplary embodiment of the present invention.

In the present exemplary embodiment, the shaking intensity of the terminal may be categorized into two ranges. The controller 180 displays an image 2500 on the touch screen {see FIG. 19(*a*)}. The user softly touches the displayed image 2500. The terminal shaking intensity detection sensor detects the shaking intensity in response to the touch to generate a detection signal. The terminal shaking intensity detection sensor transmits the detection signal to the controller 180. The controller 180 identifies the shaking intensity as corresponding to a first range based on the detection signal, and controls in such a manner that the displayed image be shaken a little.

The controller 180 displays an image 2500 on the touch screen {see FIG. 19(*b*)}. The user strongly touches the displayed image 2500. The terminal shaking intensity detection sensor detects the shaking intensity in response to the touch to generate a detection signal. The terminal shaking intensity detection sensor transmits the detection signal to the controller 180. The controller 180 identifies the shaking intensity as corresponding to a second range based on the detection signal, and controls in such a manner that the displayed image be shaken profusely.

Figure 20:
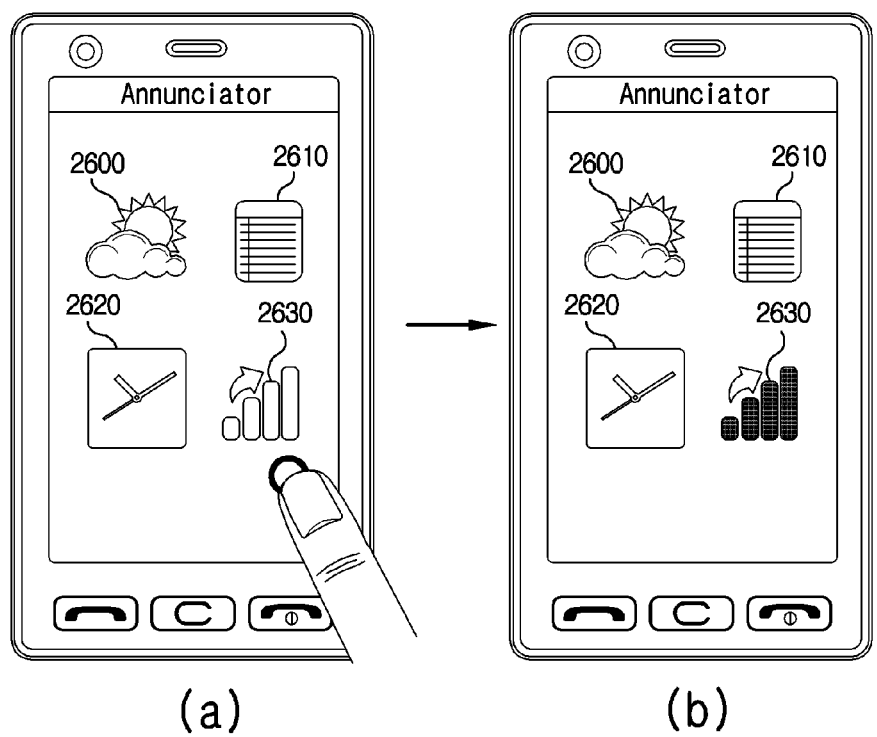
FIG. 20 is an image drawing for illustrating a method for processing a touch signal in a mobile terminal according to a sixteenth exemplary embodiment of the present invention.

FIG. 20 is an image drawing for illustrating a method for processing a touch signal in a mobile terminal according to a sixteenth exemplary embodiment of the present invention.

The controller 180 displays on the touch screen a shaking intensity display icon 2630 for displaying a plurality of icons 600, 2610, 2620 and the terminal shaking intensity {see FIG. 20(*a*)}. The user strongly touches one 2620 of the icons out of the plurality of icons 600, 2610, 2620. The terminal shaking intensity detection sensor detects the shaking intensity in response to the touch to generate a detection signal. The terminal shaking intensity detection sensor transmits the detection signal to the controller 180. The controller 180 identifies the shaking intensity as being strong based on the detection signal.

The controller 180 displays the touched icon 2620 largely to change the shaking intensity display icon 2630 {see FIG. 20(*b*)}. The size change of the touched icon 2620 and the change of the shaking intensity display icon 2630 may be varied according to the terminal shaking intensity. The controller 180 may display the untouched icons 2600, 2610 to a smaller size. As a result, the user can easily grasp the intensity of touch on the touch screen.

FIG. 21 is an image drawing for illustrating a method for processing a touch signal in a mobile terminal according to a seventeenth exemplary embodiment of the present invention.

The controller 180 displays on the touch screen a shaking intensity display icon 2710 for displaying the terminal shaking intensity {see FIG. 21(*a*)}. In the present exemplary embodiment, the shaking intensity may be divided into five ranges, such that the shaking intensity display icon 2710 includes five blocks.

The user touches a portion that is not displayed with icons by intensity corresponding to a third range. The terminal shaking detection sensor detects the shaking intensity in response to the touch to generate a detection signal. The terminal shaking intensity detection sensor transmits the detection signal to the controller 180. The controller 180 identifies the shaking intensity as corresponding to the third range.

The controller 180 changes three blocks out of the shaking intensity display icon 2710 and greatly displays an icon 2701 corresponding to the third range {see FIG. 21(*b*)}. In a case the terminal shaking intensity belongs to a second range, the controller 180 changes two blocks out of the shaking intensity display icon 2710 and greatly displays an icon corresponding to the second range. The displayed icon is determined by the shaking intensity. The displayed icon may be set up beforehand by the user. The change of the shaking intensity display icon 2710 may vary in response to the terminal shaking intensity.

In another example, an icon corresponding to the shaking intensity may be displayed on the touch screen. In still another example, an icon corresponding to the shaking intensity may be selected and executed. As a result, the user can vary the terminal shaking intensity to select a desired item.

Figure 22:
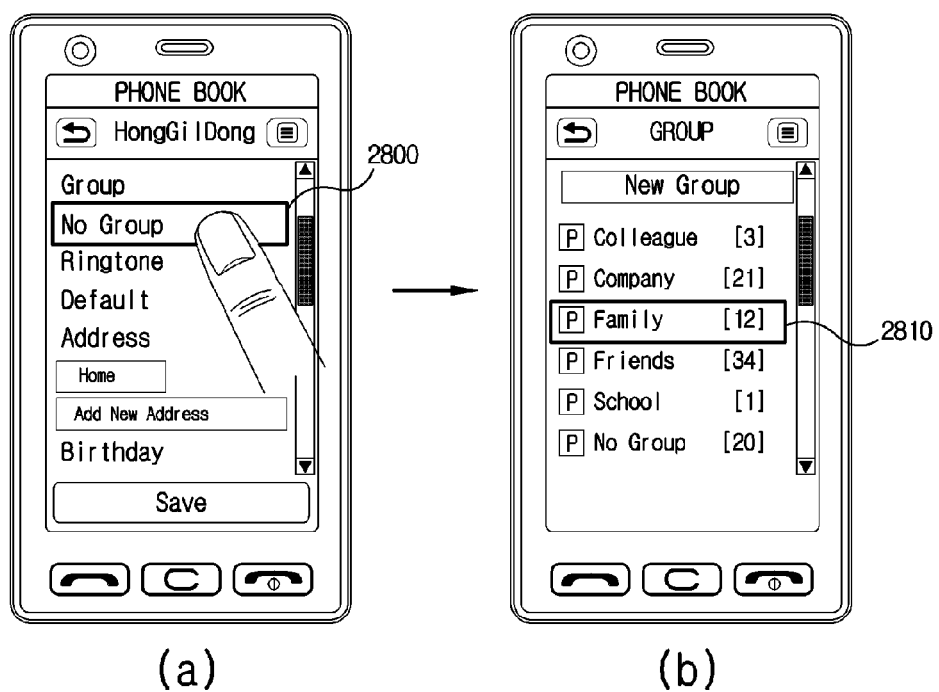
FIG. 22 is an image drawing for illustrating a method for processing a touch signal in a mobile terminal according to an eighteenth exemplary embodiment of the present invention.

FIG. 22 is an image drawing for illustrating a method for processing a touch signal in a mobile terminal according to an eighteenth exemplary embodiment of the present invention.

In the instant exemplary embodiment, the terminal shaking intensity may be divided into three ranges. The controller 180 displays on the touch screen a phone book including a group window 2800 for designating a group {see FIG. 22(*a*)}. The user touches the group window in the intermediate intensity. The terminal shaking intensity detection sensor detects the shaking intensity in response to the touch to generate a detection signal. The terminal shaking intensity detection sensor transmits the detection signal to the controller 180. The controller 180 identifies the shaking intensity as corresponding to a second range based on the detection signal, and designates a name of '홍길동 (HongGilDong)' in a family group 2810 corresponding to the second range {see FIG. 22(*b*)}.

For example, in a case the terminal shaking intensity belongs to a first range, the controller 180 may designate the name of '홍길동 (HongGilDong)' in a friend group. That is, the controller 180 may designate a designated name in a friend group, a school group or a company group based on the shaking intensity.

Furthermore, the controller 180 displays a name item on the touch screen. The user may touch the displayed name item to designate a group of the name item. As a result, the user can vary the terminal shaking intensity to designate a designated name in a desired group.

FIG. 23 is an image drawing for illustrating a method for processing a touch signal in a mobile terminal according to a nineteenth exemplary embodiment of the present invention.

In the present exemplary embodiment, the terminal shaking intensity may be divided into three ranges.

The controller 180 may display a musical image on the touch screen {see FIG. 23(*a*)}. The user strongly touches a particular portion of the displayed musical image. The controller 180 can detect a position of the particular portion touched on the touch screen.

The terminal shaking intensity detection sensor detects the shaking intensity in response to the touch to generate a detection signal. The terminal shaking intensity detection sensor transmits the detection signal to the controller 180. The controller 180 identifies the shaking intensity as corresponding to a third range based on the detection signal, and also detects the touched position of the particular portion.

The controller 180 greatly outputs a sound corresponding to the touched position of the particular portion {see FIG. 23(*b*)}. If the terminal shaking intensity belongs to a first range, the controller 180 outputs a sound corresponding to the touched particular portion in a low tone. The controller 180 can vary not only the intensity of the sound in response to the shaking intensity but control in such a fashion that the displayed musical image be shaken {see FIG. 23(*c*)}. As a result, the user can vary the terminal shaking intensity to output various different tones of sound.

FIG. 24 is an image drawing for illustrating a method for processing a touch signal in a mobile terminal according to a twentieth exemplary embodiment of the present invention.

The optical sensor 145 embedded in the terminal can detect the brightness of light. The controller 180 determines the brightness of light based on a signal detected by the optical sensor 145. The controller 180 determines an intensity of sound or vibration based on the brightness of light. For example, if the terminal is positioned in a dark place (e.g., inside a bag), the controller 180 determines that it is dark using the optical sensor. Based on the determination, the controller 180 controls such that a signal for notifying the occurrence of an event including a call signal reception, a message reception or the like should be strongly outputted. That is, the controller 180 greatly outputs sound and vibration {see FIG. 24(*a*)}.

Meanwhile, if the terminal is situated in a bright place, the controller 180 determines that it is bright using the optical sensor. Based on the determination, the controller 180 controls such that a signal for notifying the occurrence of an event including a call signal reception, a message reception or the like should be strongly outputted. That is, the controller 180 greatly outputs sound and vibration {see FIG. 24(*b*)}. As a result, the user can further easily identify the occurrence of an event in the terminal.

The above-mentioned method for processing a touch signal in a mobile terminal and mobile terminal using the same may, however, be embodied in many different forms and should not be construed as limited to the embodiments set forth herein. While a particular feature or aspect may have been disclosed with respect to only one of several implementations, such feature or aspect may be selectively combined with one or more other features and/or aspects of other implementations as may be desired.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Thus, it is intended that embodiments of the present disclosure may cover the modifications and variations of this disclosure provided they come within the scope of the appended claims and their equivalents.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for processing a user input in a mobile terminal, the method comprising:
    displaying data on a touch screen of the mobile terminal;
    receiving a touch input on a portion of the data on the touch screen;
    detecting movement of the mobile terminal while the touch input on the portion of the data is maintained;
    changing a size of the data based on an area where the touch input is received in response to the movement of the mobile terminal; and
    displaying the size-changed data on the touch screen.

2. The method of claim 1, further comprising determining an intensity of the touch input on the portion of the data on the touch screen.

3. The method of claim 2, further comprising performing a function based on the intensity of the touch input when the intensity of the touch input is greater than a predetermined threshold.

4. The method of claim 1, further comprising:
    displaying a page-down or page-up icon on the touch screen;
    receiving a touch input on the page-down or page-up icon;
    determining an intensity of the touch input; and
    displaying the data scrolled-down or scrolled-up based on the intensity of the touch input on the page-down or page-up icon.

5. The method of claim 1, wherein:
    the movement of the mobile terminal includes a movement upward; and changing the size of the data comprises enlarging the size of the data.

6. The method of claim 1, wherein:
    the movement of the mobile terminal includes a movement downward; and
    changing the size of the data comprises reducing the size of the data.

7. The method of claim 1, wherein changing the size of the data comprises changing the size of the data corresponding to a position where the touch input is received.

8. The method of claim 7, wherein changing the size of the data further comprises changing a size of a first portion of the data corresponding to a specific area around the position where the touch input is received while maintaining a size of a second portion of the data that doesn't correspond to the specific area.

9. The method of claim 7, wherein changing the size of the data further comprises changing a size of a first portion of the data inside a specific area around the position where the touch input is received while maintaining a size of all other data displayed on the touch screen.

10. A mobile terminal for processing a user input, the terminal comprising:
  a touch screen configured to receive a touch input and display data;
  a movement detection sensor configured to detect movement of the mobile terminal; and
  a controller configured to
  receive a touch input on a potion of the data on the touch screen;
  change a size of the data based on an area where the touch input is received when the movement detection sensor detects the movement of the mobile terminal while the touch input on the portion of the data is maintained, and
  control the touch screen to display the size-changed data.

11. The mobile terminal of claim 10, wherein the controller is further configured to determine an intensity of the touch input on the portion of the data on the touch screen.

12. The mobile terminal of claim 11, wherein the controller is further configured to perform a function based on the intensity of the touch input when the intensity of the touch input is greater than a predetermined threshold.

13. The mobile terminal of claim 10, wherein the controller is further configured to:
  control the touch screen to display a page-down or page-up icon;
  receive a touch input on the page-down or page-up icon;
  determine an intensity of the touch input; and
  control the touch screen to display the data scrolled-down or scrolled-up based on the intensity of the touch input on the page-down or page-up icon.

14. The mobile terminal of claim 10, wherein:
  the movement of the mobile terminal includes a movement upward; and
  the controller further configured to enlarge the size of the data based on the area where the touch input is received.

15. The mobile terminal of claim 10, wherein:
  the movement of the mobile terminal includes a movement downward; and
  the controller is further configured to reduce the size of the data based on the area where the touch input is received.

16. The mobile terminal of claim 10, wherein the controller is further configured to change the size of the data corresponding to a position where the touch input is received.

17. The mobile terminal of claim 16, wherein the controller is further configured to change the size of a first portion of the data corresponding to a specific area around the position where the touch input is received while maintaining a size of a second portion of the data that does not correspond to the specific area.

18. The mobile terminal of claim 16, wherein the controller is further configured to change the size of the data inside a specific area around the position where the touch input is received while maintaining a size of all other data displayed on the touch screen.

* * * * *